United States Patent [19]

Couey et al.

[11] Patent Number: 4,618,497
[45] Date of Patent: Oct. 21, 1986

[54] QUARANTINE SYSTEM FOR PAPAYA

[75] Inventors: H. Melvin Couey, Hilo; Charles F. Hayes, Kailua, both of Hi.

[73] Assignees: The United States of America as represented by the Secretary of Agriculture, Washington, D.C.; The University of Hawaii, Honolulu, Hi.

[21] Appl. No.: 757,396

[22] Filed: Jul. 22, 1985

[51] Int. Cl.$^4$ ............................................. A23L 1/212
[52] U.S. Cl. .................................... 426/233; 426/615; 426/521
[58] Field of Search ............... 426/615, 438, 418, 419, 426/509, 520, 231, 232, 233, 521

[56] References Cited

PUBLICATIONS

J. W. Armstrong, "Development of a Hot-Water Immersion Quarantine Treatment for Hawaiian-Grown 'Brazilian' Bananas," *Journal of Economic Entomology* 75(5): 787-790 (1982).

E. B. Hundtoft and E. K. Akamine, "Establishing the Effects of Post-Harvest Treatment on Fresh Market Papayas by Response Surface Methodology," *Journal of Agricultural Engineering Research* 16:343-352 (1971).

S. T. Seo, G. J. Farias, and E. J. Harris, "Oriental Fruit Fly: Ripening of Fruit and Its Effect on Index of Infestation of Hawaiian Papayas," *Journal of Economic Entomology* 75(2): 173-178 (1982).

S. T. Seo, C-S. Tang, S. Sanidad, and T. H. Takenaka, "Hawaiian Fruit Flies (Diptera: Tephritidae): Variation of Index of Infestation with Benzyl Isothiocyanate Concentration and Color of Maturing Papaya," *Journal of Economic Entomology* 76(3): 535-538 (1983).

H. S. Carslaw and J. C. Jaeger, "Conduction of Heat in Solids," Oxford University Press, London, pp. 198-199 (1959).

C. F. Hayes, "Thermal Diffusivity of Papaya Fruit (Carica Papaya L., Var. Solo," *Journal of Food Science* 49(4): 1219 & 1221 (1984).

C. F. Hayes, H. T. G. Chingon, F. A. Nitta, and W. J. Wang, "Temperature Control as an Alternative to Ethylene Dibromide Fumigation for the Control of Fruit Flies (Diptera: Tephritidae) in Papaya," *Journal of Economic Entomology* 77(3): 683-686 (1984) (first mailed to subscribers Aug. 8, 1984).

H. M. Couey, E. S. Linse, and A. N. Nakamura, "Quarantine Procedure for Hawaiian Papayas Using Heat and Cold Treatments," *Journal of Economic Entomology* 77(4): 984-988 (1984).

*Primary Examiner*—Raymond N. Jones
*Assistant Examiner*—Carolyn Paden
*Attorney, Agent, or Firm*—M. Howard Silverstein; David G. McConnell; Margaret A. Connor

[57] ABSTRACT

A novel system to ensure that papaya are free of fruit flies so as to meet quarantine restrictions is described. Papaya are subjected to selection on the basis of color in combination with a two-stage heated fluid treatment wherein time and temperature of the treatment are maintained within narrowly defined parameters. With this system, excellent fruit quality is maintained. The system is suitable for commercial use.

7 Claims, 10 Drawing Figures

QUARANTINE SYSTEM FOR PAPAYA

BACKGROUND OF THE INVENTION

This invention relates to a novel system to ensure that papaya are free of fruit flies so as to meet quarantine restrictions. The method includes multiple heated fluid treatments in combination with fruit selection based on color.

Papaya (*Carica papaya* L.) is a tropical plant, the fruit of which is ovoid-oblong to nearly spherical with an outer thin skin, a thick fleshy edible inner portion, and a central seed-containing cavity. The unripe fruit is smooth and green, turning yellowish or orange when ripe, with an orange or reddish-orange fleshy edible portion. The ripe edible flesh has the consistency of butter and a mild and pleasant flavor.

Papayas are the fourth most important source of farm income in Hawaii, exceeded only by sugar, pineapples, and macadamia nuts. It is estimated that the 1984 papaya production was about 7 million pounds with a value of $17 million. About 70 percent of the crop is shipped to the mainland United States and Canada, and 15 percent to Japan. The remaining 15 percent is consumed in Hawaii.

Tephritid fruit flies (Diptera: Tephritidae) such as the Mediterranean fruit fly [(*Ceratitis capitata* (Wiedemann)], the oriental fruit fly (*Dacus dorsalis* Hendel), and the melon fly (*Dacus cucurbitae* Coquillett) are present in Hawaii and have been shown to spread as larvae or eggs in fruits or vegetables shipped from infested areas. Fruit flies are among the most destructive insect pests of citrus, deciduous fruits, and vegetables; and papayas produced in Hawaii cannot be shipped to the mainland U.S. or Japanese markets without quarantine treatment due to possible fruit fly infestation. Because of the economic importance of the papaya crop to Hawaiian agriculture and the destructiveness of fruit flies, a procedure to disinfest the fruit of the flies is of vital importance.

In the past, the standard treatment for papayas was fumigation with ethylene dibromide (EDB). However, new quarantine procedures are needed as the United States Environmental Protection Agency cancelled the use of EDB as a food fumigant effective Sept. 1, 1984, because of concerns regarding its safety. Methyl bromide cannot be used on papayas because of the phytotoxicity at effective concentrations. The only other fumigant which has shown promise for papaya is phosphine, and this material requires a minimum treatment of 48 hours. One of the difficulties in developing quarantine treatments is the requirement that no insects survive to provide a breading population capable of becoming established at the destination. The widely accepted security level is "probit 9," or no more than 32 survivors per 1,000,000 treated insects at the 95% confidence level (mortality of 0.999968).

One suggested approach for disinfestation of fruit is the use of heat. A 15-minute, 50° C. hot-water immersion treatment has been tested successfully for fruit fly disinfestation of bananas (Armstrong, *Journal of Economic Entomology* 75(5): 787–790 (1982)). While a 20-minute, 49° C. hot water immersion has been used on papaya, to control postharvest decay, heat treatments alone, that is without additional treatment such as fumigation with EDB, have not been effective for disinfesting papaya. This is because papayas are so large and their thermal diffusivity so low that by the time the interior of the fruit is warm enough to kill eggs or larvae of the fruit flies, the exterior of the fruit is damaged. Thus, while the obvious approach to disinfest papayas using heat would be to heat the fruit longer or at higher temperatures than for decay control, damage to the papaya from thermal stress occurs before a probit 9 mortality is achieved. Relative to the standard decay control treatment, if either the submersion time or the water temperature is increased, scalding will result as manifested by the development of an undesirable splotchy off-color, ranging from bright orange to a leathery brown. Additionally, the subsequent coloring rate will be delayed (further increases will stop the yellowing process) and the natural aroma and flavor of papaya will be detrimentally affected (Hundtoft and Akamine, *Journal of Agricultural Engineering Research* 16:343–352 (1971)).

Seo et al. (*Journal of Economic Entomology* 76(3):535–538 (1983)) showed that infestation of papaya by the oriental fruit fly (the fruit fly variety which most often infests papaya) was related to fruit ripeness, and that fruit which are one-quarter or less ripe have minimal infestation. While such knowledge can be of assistance in selecting papaya with minimal fruit fly infestation, it is not sufficient for quarantine control, either alone or in combination with the heat treatment for decay control described above, because the required insect mortality cannot be achieved with sufficient certainty.

SUMMARY OF THE INVENTION

We have now unexpectedly discovered a novel system to ensure that papaya are free of fruit flies so as to meet quarantine restictions while maintaining excellent fruit quality. Our method includes, in combination, fruit selection based on color and multiple heated fluid treatments wherein time and temperature of the treatments are maintained within narrowly defined parameters. This method is suitable for commercial use.

In the method of the invention, fruit of the papaya plant, hereinafter papaya, are subjected to a two-stage heated fluid treatment and a fruit selection step based on ripeness-maturity of the fruit as determined by color.

In the first step of the heated fluid treatment (step a), papaya are heated for about 30 to 60 minutes ($t_1$) in fluid maintained at about 38° to 45° C. ($T_1$). In the second step of the heated fluid treatment (step b), the papaya from step (a) are heated for about 5 to 30 minutes ($t_2$) in fluid maintained at about 45° to 55° C. ($T_2$).

In our method, the temperature of step (a) must be lower than step (b); the time of step (a) must be equal to or greater than the time of step (b); and three of the time/temperature parameters, e.g., $t_1$, $T_1$, $t_2$, and $T_2$, are set, and the fourth value is selected from the prediction equation;

$$S = \sum_j s_j P_j$$

where S is a set value which is determined by the mortality of fruit fly eggs that is required, $P_j$ is the probability for the occurrence of an egg at depth j, and $s_j$ is the survival of the egg in depth j.

In the fruit selection step, the color of the papaya is measured using a Hunter Colorimeter or equivalent instrument, and papaya are rejected which have either:

(1) a blossom end Hunter b value greater than 27.4 or (2) a yellow spot Hunter b value greater than 30.5.

With our invention, papaya can be heated to a temperature and for a time such that fruit fly eggs are killed and such that damage to the fruit from thermal stress does not occur or is kept to a minimum.

Quality tests, including flavor, texture, absence of scarring or pitting, and no increase in hard spots due to uneven ripening, which have been carried out on papaya treated by our method, have shown that excellent quality is maintained.

In accordance with this discovery, it is an object of the invention to provide a method for obtaining high quality papaya free of viable fruit flies.

It is a further object of the invention to provide a method for disinfesting papaya of the Mediterranean fruit fly, the melon fly, and the oriental fruit fly, and thereby allow the fruit to pass through both domestic and international quarantine restrictions which have been imposed to restrict the dissemination of fruit flies.

It is also an object of the invention to provide a quarantine method suitable for commercial use.

Other objects and advantages of the invention will become apparent from the ensuing description.

DETAILED DESCRIPTION OF THE INVENTION

The method of the invention includes multiple heated fluid treatments in combination with fruit selection based on ripeness-maturity as determined by color.

TWO-STAGE HEATED FLUID TREATMENT

In the first step (step a) of the two-stage heated fluid treatment, papaya are heated about 30 to 60 minutes and preferably 30 to 40 minutes in fluid maintained at a temperature of about 38° to 45° C. and preferably 41° to 43° C.

Next, papaya from step (a) are heated in step (b) about 50 to 30 minutes and preferably 18 to 22 minutes in fluid maintained at a temperature of about 45° to 55° C. and preferably 48° to 50° C.

The combination of times and temperatures of steps (a) and (b) are critical in order for the papaya to be disinfested without damage to the fruit. The temperature of step (a) must be lower than step (b), and the time of step (a) must be equal to or greater than the time of step (b). It is also a critical feature that the time between the treatments of steps (a) and (b) not exceed 3 minutes. Surprisingly, by using these conditions, it is possible to effect a deeper heat penetration into the fruit beyond that with a single heat treatment without raising the surface temperature of the fruit, thereby disinfesting papaya of fruit flies with minimal heat damage.

In the two-stage treatment, three of the four time/-temperature parameters are set, and the fourth value necessary to reach the desired level of disinfestation with minimal heat damage is selected by the prediction equation:

$$S = \sum_j s_j P_j \tag{1}$$

where the overall survival, S, is a set value determined by the mortality of fruit fly eggs that is desired by the treatment, and is the sum of the products of survival at depth j ($s_j$) multiplied by the probability of the occurrence of an egg at each depth ($P_j$) as described in detail below.

It is a critical feature of the invention that heating of the papaya be with a fluid. This may be carried out by immersion in fluid at the selected temperature or by use of heated fluid sprays or combinations thereof. Water is the liquid of choice because of it is readily available, relatively inexpensive, and is suitable for food use. Other fluids useful in the practice of the invention include salt water, oil, and water mixed with chemicals for controlling fungus or other fruit quality enhancing substances. Heating with microwaves is not included in the compass of the invention; such heating will not result in the required level of disinfestation wherein high fruit quality is maintained.

The derivation of the prediction equation (1) and description of how $s_j$ and $p_j$ are obtained are described in detail below with reference to Examples 1–4.

Figure 1:
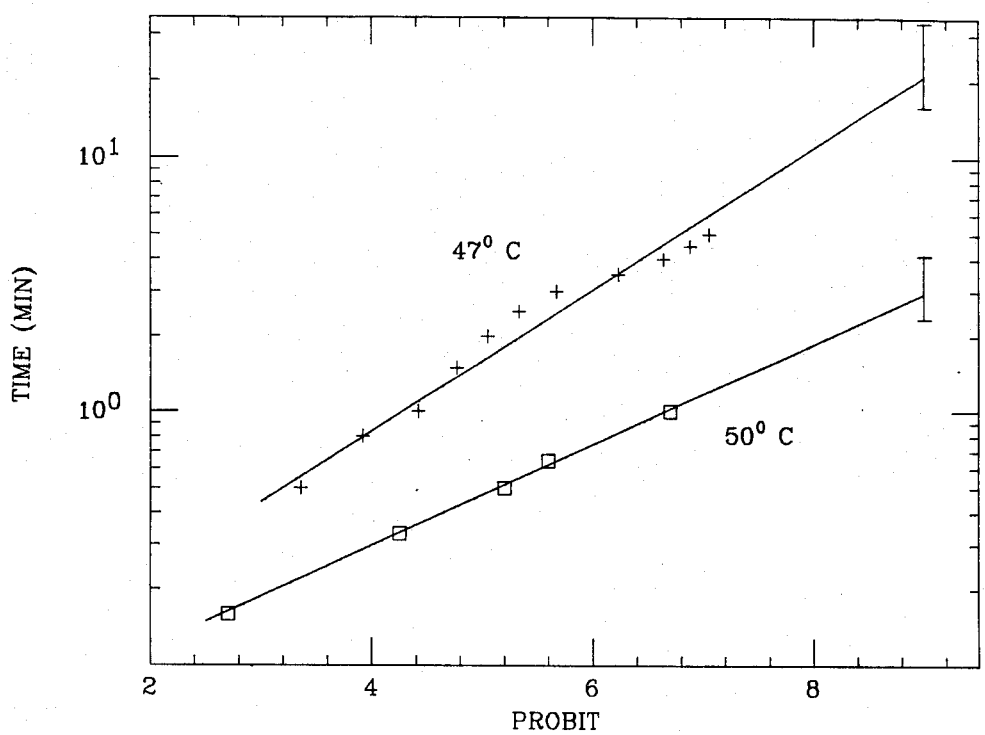
FIG. 1 shows the duration of immersion of *D. dorsalis* eggs in water as a function or probit for 47° and 50° C.

It can be seen from the data used for FIG. 1 (Example 2) that for a given temperature, the logarithm of survival, s, of *D. dorsalis* eggs immersed directly into water versus immersion duration, t, is linear:

$$\ln(s) = -at \tag{2}$$

where a is a function of temperature:

$$a = a(t) \tag{3}$$

Figure 2:
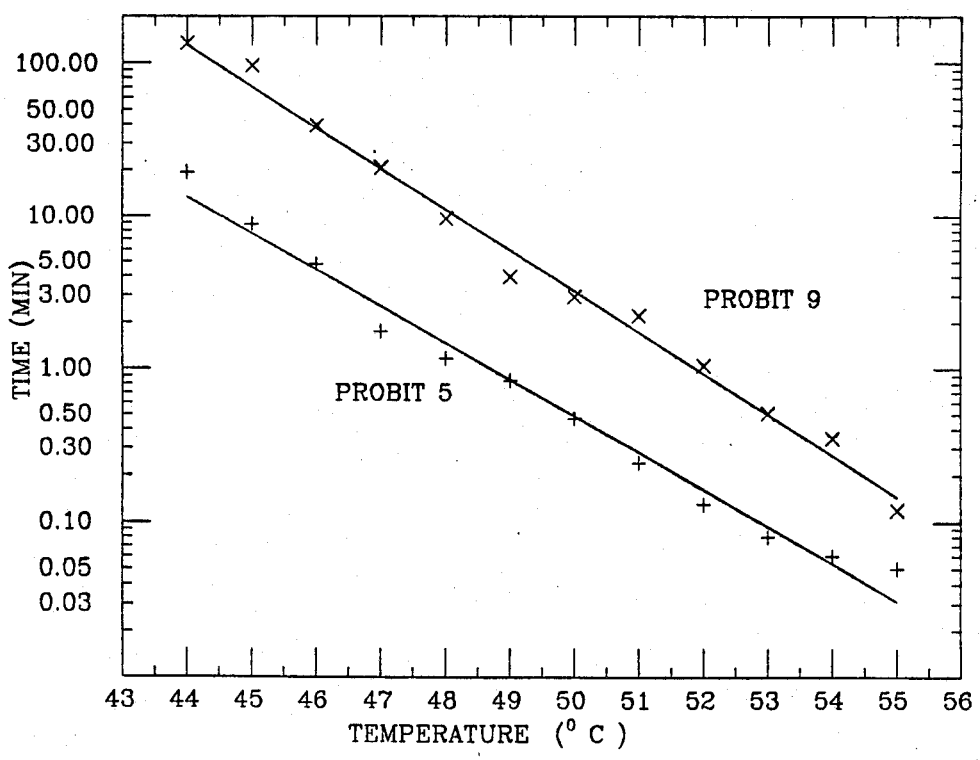
FIG. 2 shows the duration of immersion versus temperature for *D. dorsalis* eggs in water at probit 5 and probit 9.

Data from Example 2, FIG. 2, show that for a given survival, or fixed morality probit, a semilogarithmic plot of t versus temperature, T, is linear:

$$\ln(t) = b + cT \tag{4}$$

where b and c are constants are fixed s. The simplest form for a(T) which satisfies Equation (2) and (4) is:

$$a = C \exp(AT - B) \tag{5}$$

where A, B, and C are constants. Using the data from FIGS. 1 and 2, one obtains A=0.554/°C., B=26.8, and Cd=1.0 minute.

Neglecting any synergism between successive stresses, if ½ of the organisms survive an initial stress and the same ratio survive two additional stresses, their overall survival will be $\frac{1}{2} - \frac{1}{2} \times \frac{1}{2} = \frac{1}{8}$. We divide any treatment schedule into a series of one minute stresses:

$$s = s_1 \times s_2 \times s_3 \times \ldots \times s_i \times \ldots s_N \tag{6}$$

where N is the total number of minutes for a treatment. For example, if the papayas are placed in 42° C. water for 25 minutes and 48.9° C. water for 20 minutes, than N would be 45.

Since different depths in the papaya have different temperatures the subscript "j" is placed on "s" to denote the survival at a given depth as indicated in Table 1 (Example 1). Since the logarithm of a product is the sum of the logarithms of each factor, Equation 6 can be written as:

$$\log s_j = \sum_i \log s_{ij} = \sum_i - \exp(AT_{ij} - B)t_{ij} \tag{7}$$

where $s_j$ is the survival at depth j where for duration $t_{ij}$ the temperature has been $T_{ij}$ and where $s_{ij}$ is the survival, at depth j induced by the i th thermal stress, i.e. the i th minute of treatment.

As indicated in Table 1 of Example 1, the probability $P_j$ for the occurrence of an egg at depth j is taken as the ratio of the number of eggs found at a particular depth divided by the total number of eggs counted. The eggs are approximately one millimeter in length. The positions of the centers of the eggs are listed in the table. The temperature of an egg is taken to be the temperature of that point of the egg deepest into the fruit. Therefore, for example, the temperature at a depth of 2.5 mm will be chosen for an egg whose center is at a depth of 2.0 mm. The overall survival, S, is the sum of the products of survival at the various depths multiplied by the probability of the occurrence of an egg at each depth:

$$S = \sum_j s_j P_j \tag{1}$$

The shape of the papaya is approximated to be cylindrical. The following equation (Carslow and Jaeger, *Conduction of Heat in Solids*, Oxford University Press, London, pp. 198–199 (1959) determines the temperature at radius r in the fruit for any time, t,:

$$T = T_o - \frac{2T_o}{R} \sum_{n=1} \frac{\exp(-k\alpha_n^2 t) J_o(r\alpha_n)}{\alpha_n J_1(R\alpha_n)} + \frac{2}{R^2} \sum_{n=1} \frac{\exp(-k\alpha_n^2 t) J_o(r\alpha_n)}{J_1^2(R\alpha_n)} \int_0^R rf(r) J_o(r\alpha_n) dr \tag{8}$$

where $T_o$ is the water temperature, R is the fruit/cylinder radius (R=$r_{max}$), f(r) is the initial temperature profile, and k is the thermal diffusivity. The thermal diffusivity of papaya pulp is measured to be $1.52 \times 10^{-3}$ cm$^2$/s and that of papaya seeds to be $1.60 \times 10^{-3}$ cm$^2$/s. Since the eggs are in the outer 4 mm of the fruit, the former value applies. $J_o(\ )$ and $J_1(\ )$ are zero order Bessel functions of the first and second kind, respectively. The values of $\alpha_n$ are determined by the equation:

$$J_o(R\alpha_n) = 0 \tag{9}$$

and the value of R from:

$$\text{density} = \text{average fruit mass}/\pi R^2 L \tag{10}$$

where L is the average fruit length from blossom to stem end. We find the effective cylindrical fruit radius to be 3.32 cm.

The survival is calculated from these equations. In Equation 8 n is taken from 1 to 5. The values for $J_1(\ )$ are obtained from standard math tables since their arguments are fixed, being functions of constants. The arguments for $J_o(\ )$ are functions of r which is a variable. Therefore, a series is used to approximate this value:

$$J_o(x) = 1 - x^2/(2^2) + x^4/(2^2 4^2) - x^6/(2^2 4^2 6^2) + \ldots \tag{11}$$

Combining these equations together it is seen that if the duration and temperature of each bath is specified, the overall survival can be calculated. Similarly, if the overall survival is set, for example at 32 survivals out of a million, i.e., a probit 9 mortality, and three of the four time/temperature parameters of the two-stage heated water treatment are set, then the fourth parameter is obtained from equation (1). The solid lines in FIGS. 3 and 4 (Example 3) are the theoretically predicted survival curves calculated from the above equations. These curves are not a best fit to the data where some adjustable parameter was used. Rather, the curves have completely been determined from the equations and the stated measured constants.

Also, as in shown in Example 4, graphs can be made at a set overall survival, S, wherein time of step (a) at a set temperature is plotted versus time of step (b) at set temperatures. For example, as can be seen from FIG. 5, for a set of three time/temperatures selected, the fourth time can be determined.

Figure 6:
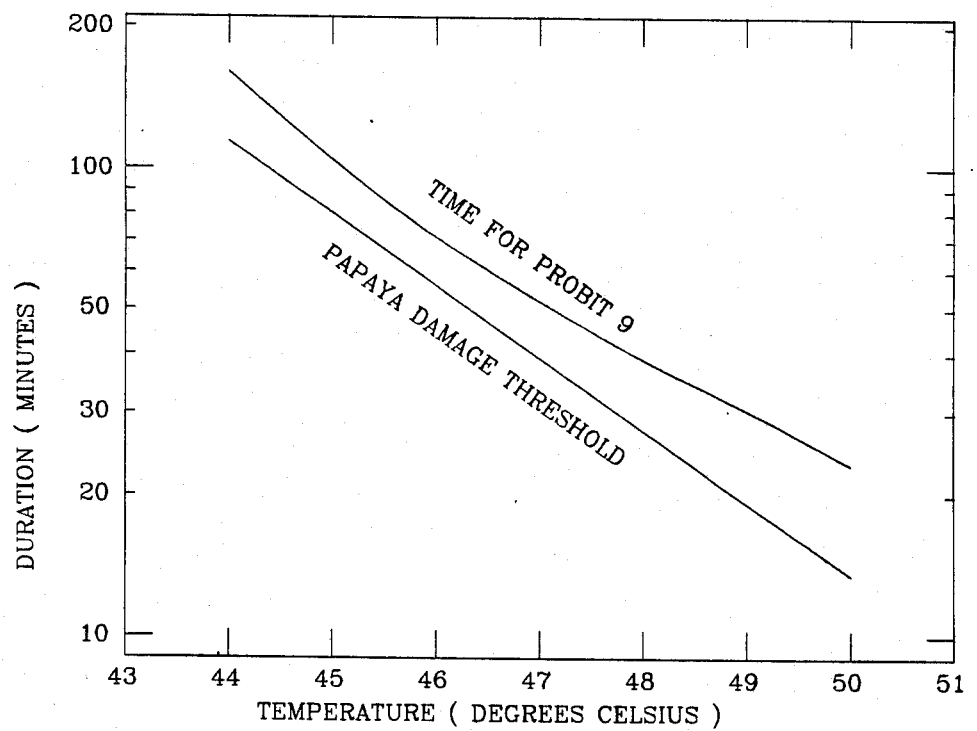
FIG. 6 shows the duration of a single immersion versus water temperature. The upper curve is the theoretical prediction for duration needed for probit 9 mortality. The lower curve is the threshold duration for damage to the fruit.

FIG. 6 (Example 5) shows a graph of treatment time versus treatment temperature for a single immersion treatment. This is not within the compass of the invention but is included for comparison purposes. The upper curve is the theoretical prediction for duration needed for probit ]mortality. The lower curve is the threshold of thermal damage for papaya for the single immersion treatment. As can be seen from FIG. 6, for the single immersion treatment, the damage threshold for papaya occurs before a probit 9 mortality is achieved.

FRUIT SELECTION STEP

Another critical step in the method of the invention is selection of papaya so as to minimize fruit fly infestation. The fruit selection step is carried out prior to or after the two-stage heated fluid treatment.

In this step, the external color of the papaya is read using a Hunter Colorimeter or equivalent instrument which gives a measure of yellowness which is related to ripeness-maturity of papaya. Those papayas are rejected which have a blossom end Hunter b value greater than 27.4 or a yellow spot Hunter b value greater than 30.5. A yellow spot of the papaya is defined as the brightest yellow spot on the fruit. It is preferred in the practice of the invention that the blossom end Hunter b value not exceed 23.4 or that the yellow spot Hunter b value not exceed 27.4 except that 1% of the fruit may exceed either standard not to exceed a Hunter b blossom end value of 26.4 or a yellow spot value of 30.4. Also in the preferred enbodiment, any fruit exceeding both 23.4 blossom end and 27.4 yellow spot value is rejected. Sampling is carried out as described in the Papaya Sampling Handbook prepared by the Hawaii State Department of Agriculture.

The colorimeter readings are carried out as follows. The colorimeter is standardized by balancing the instrument against a standard plate, L=77.8, a=−2.0, and b=23.8. The blossom end value is obtained by placing the blossom end of the fruit firmly against the instrument aperture and recording the instrument response. The yellow spot reading is obtained by placing the area which visually shows the most yellow against the aperture and recording the instrument response.

It is within the compass of the invention that colorimeters other than the Hunter Colorimeter be used to measure fruit color. Examples of such colorimeters are Neotec and Gardiner. Where other colorimeters are used, the selection values should be those equivalent to the blossom end Hunter b values and yellow spot Hunter b values defined above.

Use of the above-described color selection step is critical to ensure that only those papaya are selected which have minimal fruit fly infestation and to ensure that eggs or larvae present will be close to the surface, that is, within about 5 mm. In this way, any fruit fly infestation which may be present is killed by the two-stage heat treatment. This is described in further detail below with reference to the examples.

Use of the colorimeter values is also essential to provide an objective method for evaluating ripeness and yellow spots of papaya. While visual ripeness categories, e.g., colorbreak, one-quarter ripe, one-half ripe, three-quarter ripe, and total ripeness, are commonly used in the papaya industry, these categories are not well defined by objective standards. As shown in Table 6, the subjective classification is too variable to provide a reliable measure of fruit ripeness. Our color selection method obviates the variability of the visual method. The Hunter b values also provide a nondestructive quality control method of fruit ripeness-maturity.

EVALUATION OF THE INVENTION

Next, relationship of infestation and ripeness (determined by visual categories), relationship of infestation and Hunter b values, evaluation of the prediction model, testing of the two-stage heated water treatment on a laboratory and commercial scale, and quality of treated fruit are discussed in detail with reference to Examples 6–11. A computer program for calculating survival and mortality of fruit flies is presented in Example 12 (Table 17).

The relationship between natural infestation of papaya and visual ripeness category, identified as colorbreak, mature green, one-quarter ripe, one-half ripe, or three-quarter ripe to ripe, is examined in Example 6. As can be seen from Table 2, under commercial conditions, mature green and colorbreak fruit was never infested, and one-quarter ripe fruit was rarely infested.

The relationship between natural infestation of papaya and and visual ripeness category and Hunter b values is examined in Example 7. As is shown in Table 3, there was no infestation at Hunter b values of 21.4 or less; there was minimal infestation (2 in 1200 fruit) at values of 24.4 or less; and there was little infestation (7 in 1200 fruit) at values of 27.4 or less.

As shown in Tables 4 and 5, there was little or no infestation in fruit having a Hunter b value of less than 23.5 at the blossom end, regardless of the yellow spot value. The fruit with yellow spot values of less than 27.5 were never infested and fruit with a blossom end value less than 23.5 and a yellow spot reading less than 27.5 were never infested. In general, the yellow spot values were about 2–3 units greater than the blossom end values read on the same fruit.

Figure 7:
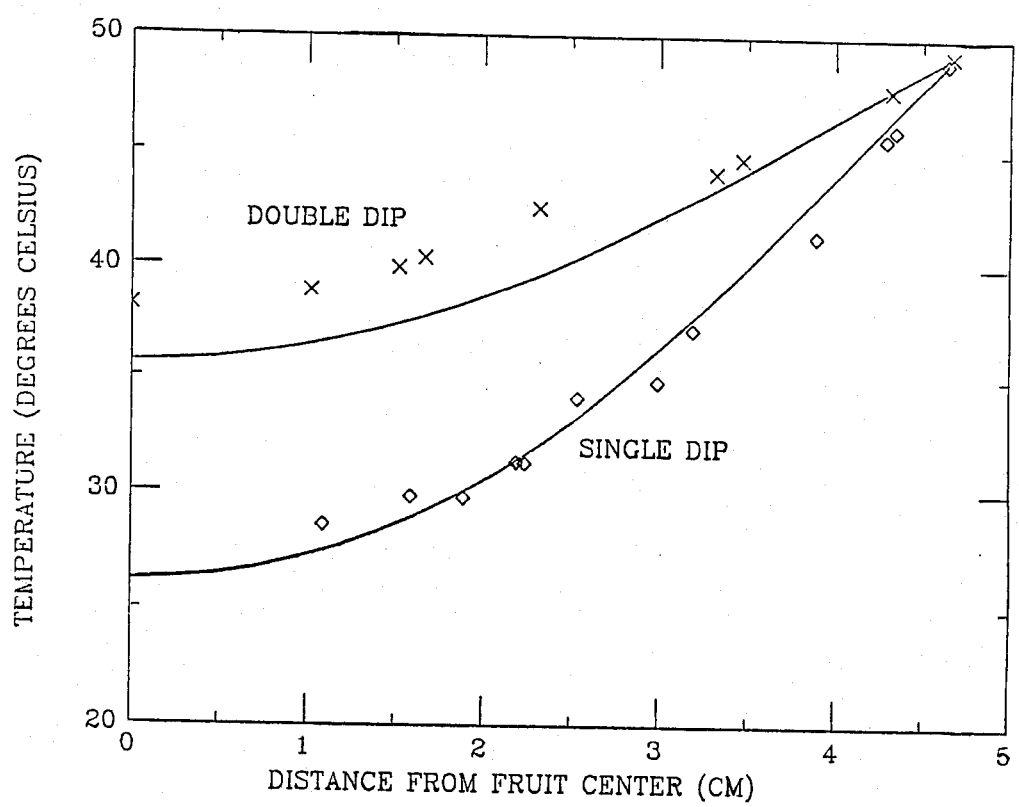
FIG. 7 shows the predicted and measured temperature profiles for papaya after a single or two-stage immersion treatment.

Evaluation of the prediction model for a single immersion of 49° C. for 20 minutes or a two-stage treatment of about 42° C. for 20 minutes followed by 49° C. for 20 minutes is described in Example 8. FIG. 7 shows the predicted and measured temperature profiles for papaya at the end of either the single or two-stage treatment. The x's and diamonds are the experimental results. The solid curve is not a best fit to the data but the prediction of temperature as a function of time from the prediction model based upon Equation (8). The spread of the data is in part the result of the variation of fruit diameter. The solid curves are for the prediction model where the average fruit diameter was used. The experimental points are for a higher temperature than that predicted by the theory with the deviation being more for the longer exposed schedule (two-stage heat treatment). This difference is attributed to the assumption that the fruit is cylindrical. Near the surface this assumption is not as severe as in the central region where heat transport from the ends of the fruit contributes. However, since as shown in Table 1 (Example 1), only the outer 4–5 mm of the fruit are of concern, FIG. 7 indicates that the prediction equation applies.

Figure 8:
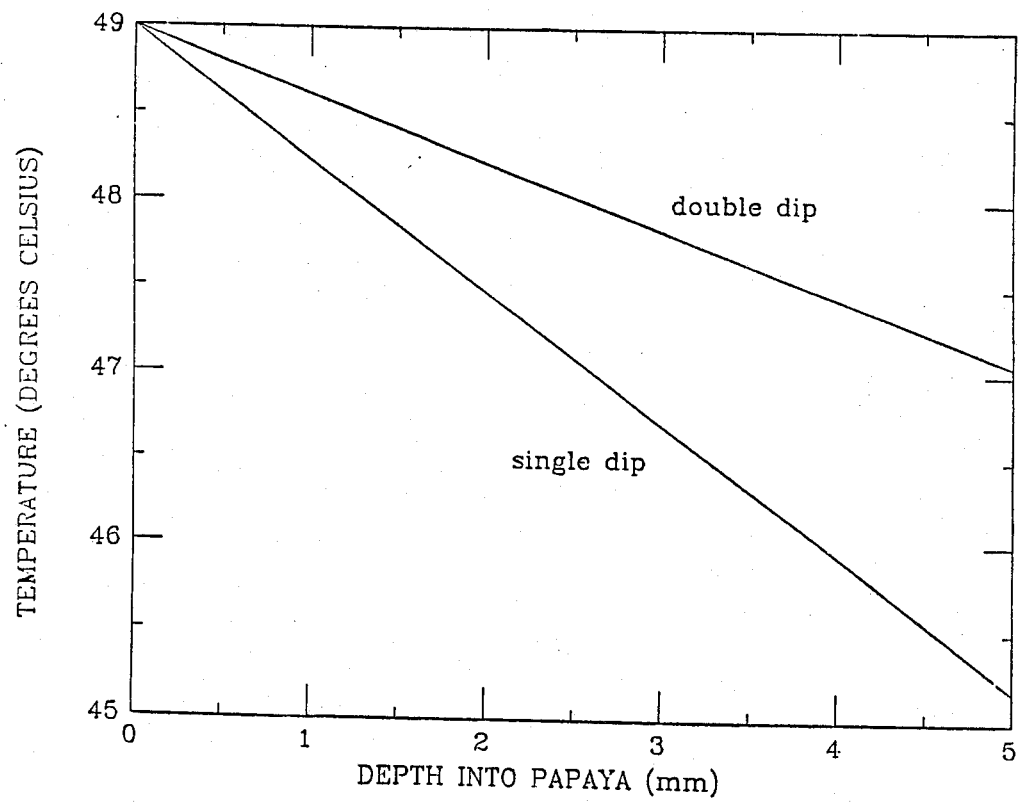
FIG. 8 shows the predicted temperature profile of papaya in the outer 5 mm of the fruit at the end of a single or two-stage immersion treament.

FIG. 8 gives the temperature profile of papaya as predicted by the model in the outer 5 mm for the temperature at the end of the single or two-stage immersion. From FIG. 8 it can be seen that the two-stage hot water treatment raises the temperature to lethal temperatures for the organism even at a depth into the papaya of 4–5 mm without raising the surface temperature of the papaya above that of the single immersion. Comparing Table 1 (Example 1), FIG. 2 (Example 2) and FIG. 8, it can be seen that the two-stage treatment, in combination with the fruit selection procedure, provides a means to disinfest papaya of fruit flies while minimizing heat damage to papaya and thereby maintaining fruit quality. In contrast, as can be seen from the slope of the curve for the single immersion, to reach temperatures lethal for fruit flies at a depth into the fruit of 4–5 mm, it is necessary to raise the surface temperature of the fruit, thereby resulting in heat damage.

Comparing the prediction of equation (8) and the probability of egg occurrence from Table 1 with the temperature time exposure needed for a probit 9 as shown in FIG. 2, the overall survival from the two-stage heat treatment method may be estimated.

Figure 9:
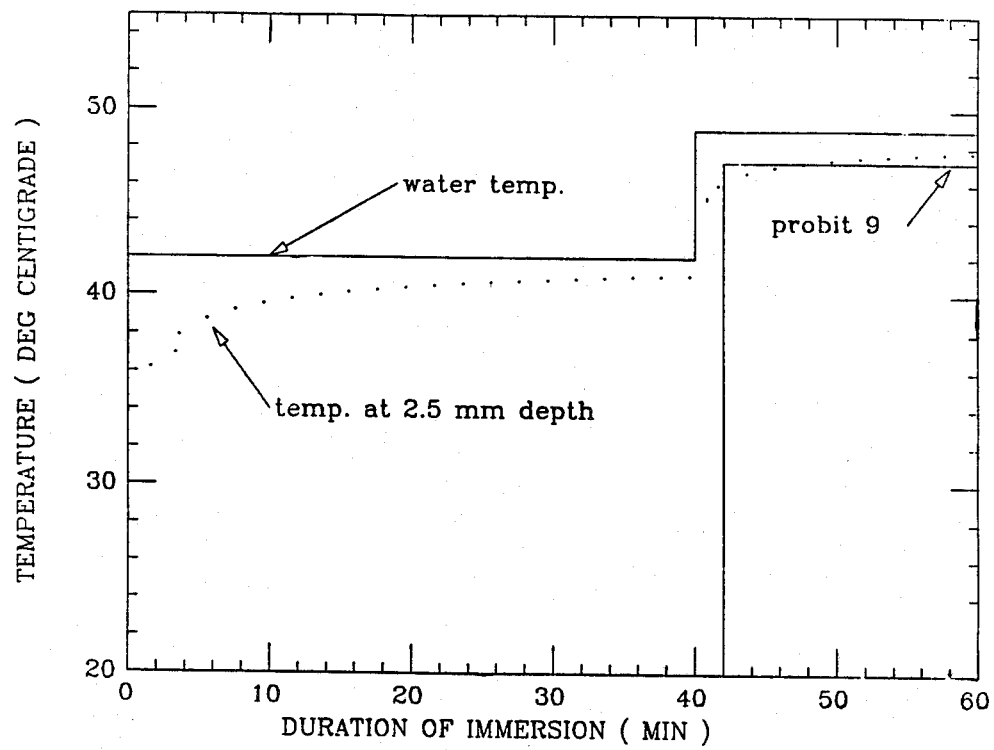
FIG. 9 shows the temperature as a function of time for the two-stage immersion treatment. The upper solid line is the water temperature in the treatment; the dotted line is the predicted temperature at a depth of 2.5 mm; and the lower solid line shows a temperature-exposure which results in a probit 9 mortality.
Figure 10:
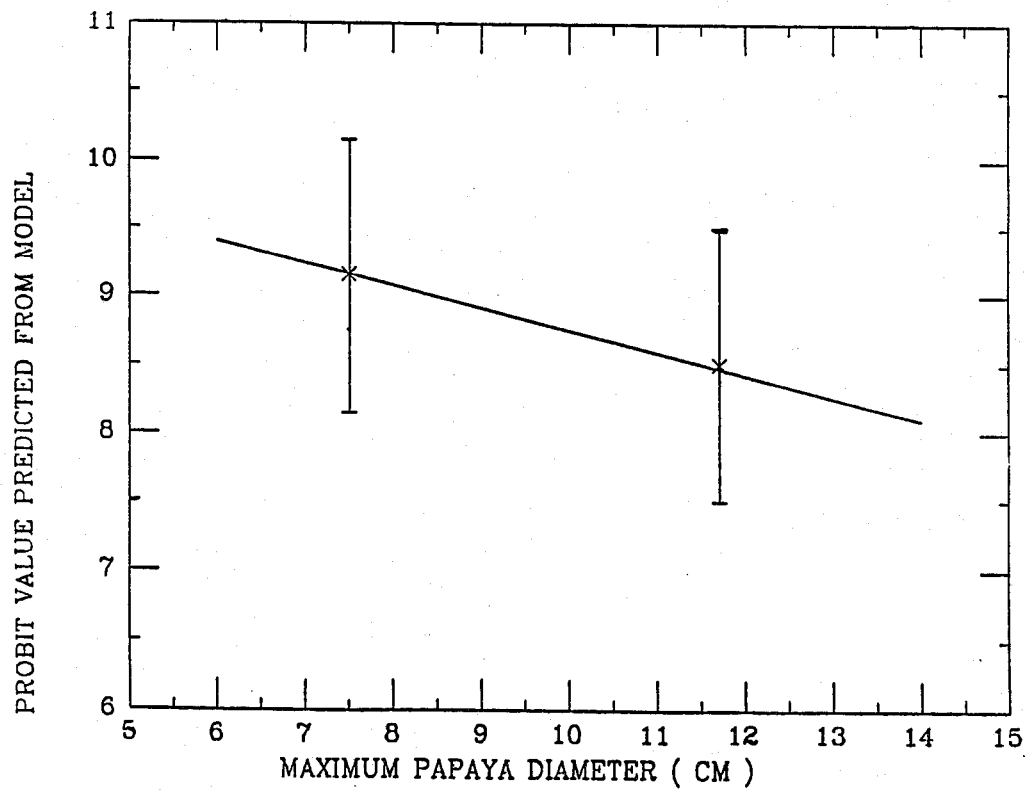
FIG. 10 shows expected probit versus maximum papaya diameter for papaya subjected to a two-stage immersion.

FIG. 9 gives the temperature as a function of exposure time for the two-stage heat treatment. The upper solid line shows the water temperature for the treatment: 42° C./40 minutes+49° C./20 minutes. The dotted line gives the temperature as a function of time at a depth of 2.5 mm into the fruit calculated from equation (8). The lower solid line shows a temperature-exposure schedule from FIG. 2 which results in a probit 9 mortality. By combining a series of these curves together with the egg-depth probability, Table 1, an overall probit can be estimated. FIG. 10 gives the result of this composite predicted probit as a function of papaya diameter. The average papaya diameter, about 9 cm, is in the range of a probit 9.

Testing of the two-stage heated water treatment on artificially infested papaya is described in Example 9. Papaya which has been harvested in a manner to minimize natural infestation were then artifically infested by exposure for 24 hours to *C. capitata, D. dorsalis,* and *D. cucurbitae*. They were next treated at 42° C. for 40 minutes followed by 49° C. for 20 minutes. As shown in Table 7, exposure of papaya to this regimen effectively kills all fruit fly eggs. As shown in Table 8, 0.67% survival was found for first instar *D. dorsalis larvae*. However, because as shown above, papaya selected by our color selection have little or no infestation, quarantine control can be attained by using in combination our fruit selection procedure and the two-stage heat treatment. Tables 9 and 10 show the effect of survival of *D. dorsalis* eggs and first instars in artificially infested papaya after heat treatment for 10, 20, 30, and 40 minutes at 42° C. followed by 20 minutes at 49° C. As can be seen from the data, the time for the first stage heat treatment can be shortened without increasing the risk of survival of either eggs or larvae.

Example 10 describes testing of the method of the invention under commercial conditions. Fruit was treated using a commercial papaya processing facility. In Example 10A, treatment was at 42° C. for 40 minutes followed by 49° C. for 20 minutes. Fruit which had been artificially infested as described in Example 9 were also treated under commercial conditions at the same time. As is shown in Table 11, no infestations were found in the artificially infested fruit in any of the eight replications. It is apparent that lethal temperatures are achieved in large scale commercial heating tanks.

The distribution of fruit into ripeness classes based on Hunter b values is shown in Table 12. In the first 4 replications, the standard was a Hunter b value of 24.5 or less; in the last 4 replications, the standard was a Hunter b value of 21.5 or less. Although a few fruits were above the levels desired it was clear that the sorters and packers quickly learned to select fruit to a given standard.

As described in Example 10B, fruit was treated under commercial conditions at 42° C. for 30 minutes followed by 49° C. for 20 minutes. The fruit was sorted to a Hunter b blossom end value of 23.5 and yellow spot value of 27.5 As shown in Table 13, the fruit was free from both infestation and hard fruit syndrome. If the distribution of papayas into Hunter b, blossom end and yellow spot classes in the test (Table 14) is compared with the distribution of natural infestation (Tables 4 and 5) in the same classes, it is clear that even fruit exceeding either standard does not fall into infested classes. Only fruit which exceeds both standards falls into infested classes.

Example 11 describes the quality of papaya treated according to the invention. In experiments in progress, we found no statistically significant difference in aroma, flavor, off flavor, texture, or overall quality attributable to the heat treatment. Some intermittent damage to the fruit was observed which was associated in part with the treatment, but was within acceptable levels. Reducing the time of the first step of the heat treatment reduced the incidence of hard fruit syndrome (Table 15). Rapid hydrocooling immediately after treatment also reduced the incidence of hard fruit (Table 16).

A computer program is presented in Example 12. When the program is run one must give as input: the fruit radius, initial temperature profile of fruit, and the minute by minute temperature of the baths. The output gives the temperature profiles and survival and mortality of the insects at the end of each minute of the treatment.

The examples are described in detail below.

EXAMPLE 1

Number of Fruit Fly Eggs as a Function of Depth in the Papaya

The number of fruit fly eggs as a function of the depth of the eggs in the fruit was determined as follows:

Papayas obtained from the Puna district of the island of Hawaii were held in sealed containers until one-half to three-fourths ripe as judged by the fraction of the surface which changed from green to yellow. The papayas in lots of fifty were placed for 24 hours at 24° C. in open-air screened cages which contained approximately 2000 mature adult oriental fruit flies (*D. dorsalis* Hendel), the predominant species found in papaya. The depth of eggs in the fruit was determined by dissecting the fruit and measuring the distance from the outer edge of the fruit to the center of the egg. The position of 274 eggs were measured to the nearest 0.5 mm.

The results, which are tabulated in Table 1, show that the deepest egg (1 out of 274 eggs) found was located 4 mm below the surface. A graph of position as a function of depth is a Gaussian-shaped curve strongly peaked at 2.5 mm. Approximately half of the eggs (143 out of 274) were found at this depth.

A similarly shaped curve was obtained for the melon fly (*D. Cucurbitae*) with the deepest eggs (3 out of 589) occurring at 5 mm.

TABLE I

| j | Depth (mm) | No. of Eggs | Pj |
|---|---|---|---|
| 1 | 0.5 | 0 | 0/274 |
| 2 | 1.0 | 3 | 3/274 |
| 3 | 1.5 | 14 | 14/274 |
| 4 | 2.0 | 34 | 34/274 |
| 5 | 2.5 | 143 | 143/274 |
| 6 | 3.0 | 57 | 57/274 |
| 7 | 3.5 | 20 | 20/274 |
| 8 | 4.0 | 3 | 3/274 |
| 9 | 4.5 | 0 | 0/274 |
| | | Total 274 | |

EXAMPLE 2

Temperature and Time of Immersion Versus Survival

*D. dorsalis* eggs (from the USDA fruit fly facility in Manoa Valley on Oahu) in groups of about 200 each were submerged in heated water for specified durations. The water was maintained at 12 fixed temperatures ranging from 44° C. to 55° C. with 5 to 11 groups of eggs per temperature. Mortality estimates were based on the number of eggs that failed to hatch. Because the hatched organism may still fail to reach the adult stage, actual mortality may be higher than this estimate. A control group of about 200 eggs not dipped in heated water, was maintained for every one to two temperatures. Abbotts' formula (Abbott, *Journal of Economic*

*Entomology* 18:265-267 (1925)) was used to calculate the survival probit.

FIG. 1 shows the immersion duration for the eggs as a function of probit for 47° and 50° C. The uncertainty bars at probit 9 reflect 95% confidence levels. The data show that for a given temperature, the logarithm of survival versus time is linear. Linearity of the fit confirms the validity of probit analysis. As expected, mortality requires longer exposure at the lower temperature.

FIG. 2 gives the probit 5 (50% mortality) and probit 9 values for eggs for temperatures ranging from 44° to 55° C. Both curves appear quite linear in the semilogarithmic graph. The coefficient of linear determination for probits 5 and 9 are 0.991 and 0.997, respectively. The data for each curve was fitted to an equation of the form:

$$\ln t = c_1 - c_2(T - 24° C.)$$

where t is the exposure time and T is the water temperature. The constants $c_1$ and $c_2$ are 13.7 and 0.55, respectively, for probit 5 and 17.6 and 0.63 for probit 9, where t is measured in minutes and T in °C.

EXAMPLE 3

Survival of Larvae versus Duration of Immersion at Set Temperatures

Infested papayas described in Example 1 were placed in groups of about ten each and exposed to a variety of immersion schedules: With initial immersions of 42° C. for 40 minutes, the second immersions were 1, 2, 3, 4, 5, 8, 10, 13, 15, and 17 minutes at 48.9° C. With final immersions of 48.9° C. for minutes, the initial immersions were 42° C. for 1, 5, 10, 15, 20, 25, and 30 minutes. There were an average of five experimental groups and two control (non-immersed) groups for each schedule tested. The mass of each papaya was measured. The total infestation of the experimental groups was based on the number of third instar larvae emerging from the control groups and the relative mass of the groups.

Each experimental group was treated within 27 hours of its initial placement in the fruit fly cage. The immersions were conducted in tanks, each 0.8 m × 0.5 m × 1.4 m, with the water under constant agitation from a continuously circulating pump having an output diameter of 3.4 cm and a flow rate of 1.8 liters per second. The papayas were maintained in wire cages which allowed the free flow of water over the surface of each fruit. After treatment, each group was immediately placed in a separate sealed container. In two weeks the containers were opened and the emerging larvae counted. Survival is defined to be the ratio of the number of emerging larvae in the experimental group to the number which would have emerged from a control group of a comparable mass.

Figure 3:
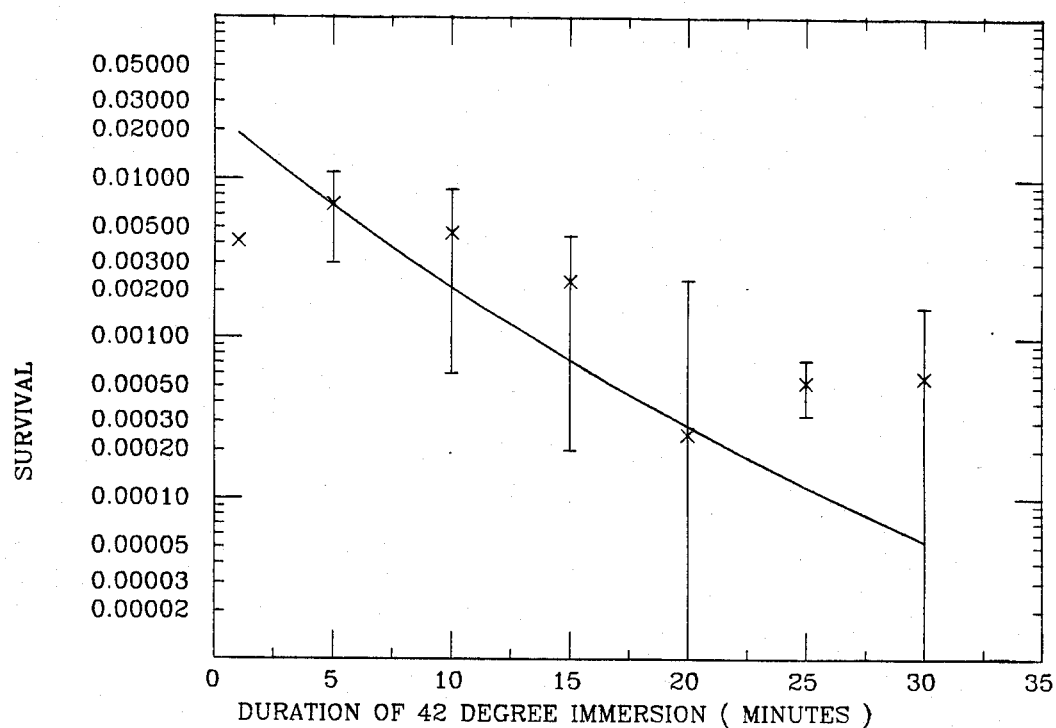
FIG. 3 shows the survival of larvae from papayas infested with eggs. Papayas were immersed in 42° C. water for durations indicated and then at 48.9° C. for 20 minutes.

The results for survival from the variation of the initial immersion duration are shown in FIG. 3. The x's indicate the experimentally determined average survival. The uncertainty limits correspond to twice the standard deviation for each schedule. The average value is numerically between these limits. The average infestation per point is approximately ten thousand organisms. For the initial immersion duration of 30 minutes, there were seven survivals out of an estimated infestation of 15,540 organisms.

Figure 4:
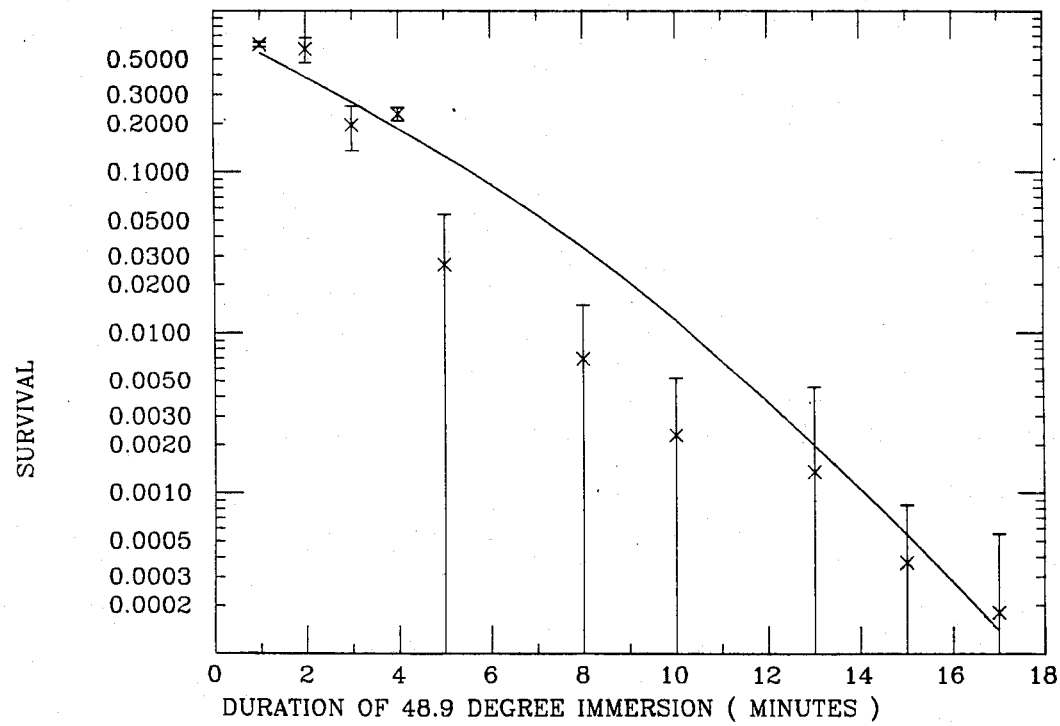
FIG. 4 shows the survival of larvae from papayas infested with eggs. Papayas were immersed in 42° C. water for 40 minutes and then at 48.9° C. for durations indicated.

FIG. 4 shows the survival from the variation of the final immersion. The average infestation per point is approximately 3,000 organisms for durations of eight minutes or less. For longer durations, the average infestation is 16,000.

EXAMPLE 4

Figure 5:
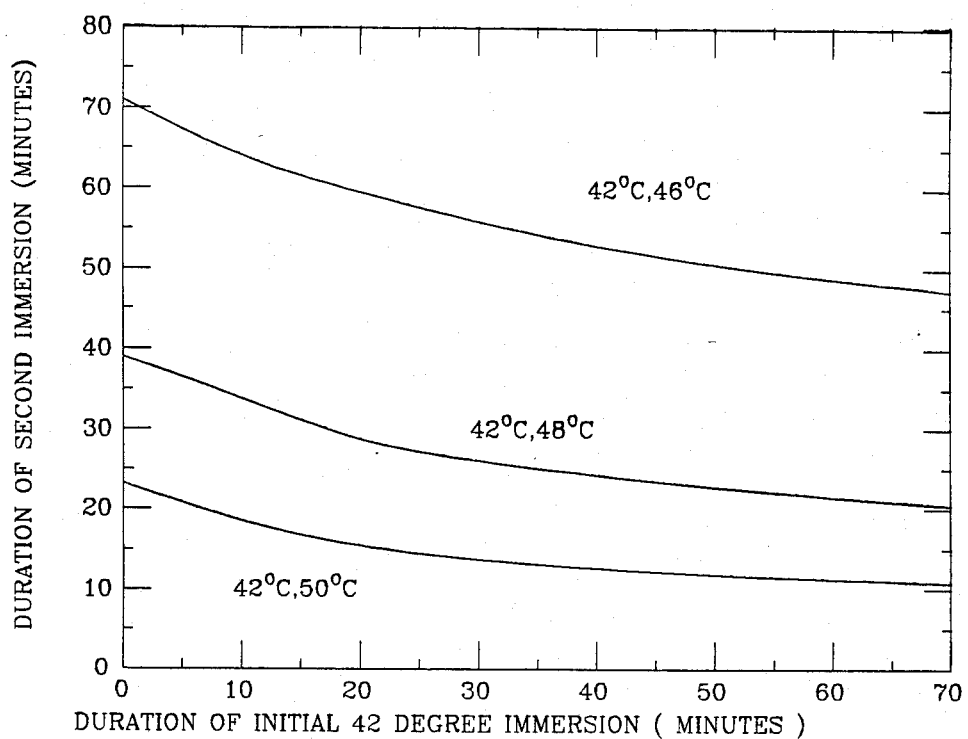
FIG. 5 shows the duration of second immersion versus duration of first immersion for a probit 9 mortality for infested papaya.

Duration of Second Immersion versus Duration of First Immersion for a Probit 9 Mortality In FIG. 5, predictions are presented for a variety of two-stage water treatments. The initial immersion for each case is 42° C. and the final immersion 46, 48, or 50° C. The graph shows the duration of the second immersion versus duration of the initial immersion for an overall probit 9 mortality. From the graph it can be seen that if papaya are immersed in a bath of 42° C. for 60 minutes, a second immersion for approximately 22 minutes at 48° C. is required for a probit 9 mortality. Similarly, values for the times of the first and second treatment required for probit 9 at these set temperatures can be determined from the graph.

EXAMPLE 5 (PRIOR ART)

FIG. 6 illustrates treatment time versus water temperature for a single heated water immersion treatment. The upper curve in the figure is the theoretical prediction obtained from equation (1) for immersion duration as a function of water temperature where S equals 32 survivals out of a million, i.e., a probit 9 mortality. For example, the above equation predicts that infested papayas must be placed in 49° C. water for 30 minutes to achieve a probit 9 mortality. The lower curve is from Hundtoft and Akamine, supra, and is for single bath durations of equal thermal stress to that of papaya immersion for 20 minutes in 48.9° C. water. Since such a stress is close to that which induces thermal damage to the papaya, this curve is considered to approximate that for the threshold of thermal damage. As can be seen from FIG. 6, for the single immersion treatment, the damage threshold for papaya occurs before a probit 9 mortality is achieved.

EXAMPLE 6

Relationship Between Natural Infestation of Papaya and Visual Ripeness Category To determine the degree of natural infestation of commercially harvested papaya, fruit was sampled from picking bins at the packing house; 20 fruits were selected in each visual ripeness category, identified as colorbreak, one-quarter ripe, one-half ripe, or three-quarter ripe to ripe. Samples were taken at approximately weekly intervals from March 1979 to August 1981 (119 samplings). In addition, during May, June, and July of 1979, fruit was harvested in the Kona district, not an important area but one heavily populated with *C. capitata* and *D. dorsalis*. There were 11 samplings of 30 fruits of each ripeness category.

The data which are tabulated in Table 2 show that under commercial conditions, mature green and colorbreak fruit was never infested and that one-quarter ripe fruit was rarely infested by *D. dorsalis*.

TABLE 2

| Ripeness | Fruit (no.) | Fruit weight (kg) | Fruit infested (no.) | Pupae recovered (no.) | Distribution of adult fruit flies from infested fruits, by species | | |
|---|---|---|---|---|---|---|---|
| | | | | | Dacus dorsalis (%) | Dacus cucurbitae (%) | Ceratitis capitata (%) |
| Puna District | | | | | | | |
| Colorbreak | 2,597 | 1,264.86 | 0 | 0 | — | — | — |
| ¼ Ripe | 2,649 | 1,301.75 | 3 | 83 | 100 | 0 | 0 |
| ½ Ripe | 2,723 | 1,350.47 | 79 | 4,366 | 96.2 | 3.1 | 0.7 |
| Ripe | 2,390 | 1,121.66 | 758 | 61,592 | 92.7 | 7.1 | 0.2 |
| Kona District | | | | | | | |
| Mature green | 330 | 134.79 | — | 0 | — | — | — |
| ¼ Ripe | 330 | 144.81 | — | 1 | 100.0 | 0 | 0 |
| ½ Ripe | 330 | 135.77 | — | 6 | 100.0 | 0 | 0 |
| Ripe | 330 | 146.43 | — | 2,964 | 99.9 | 0.1 | 0 |

EXAMPLE 7

Distribution of Naturally Infested Papaya into Hunter b Values and Relationship Between Natural Infestation of Papaya and Visual Ripeness Category and Hunter b Values A. To determine the stage of fruit fly development at harvest, freshly harvested papaya from the Hilo area, selected as described in Example 6, were peeled, ovipositional wounds identified, and the eggs and larvae removed and counted. Samples of 20 fruits in each color category were collected at 15 weekly intervals. Color at the blossom end of the fruit was measured using a Hunter Colorimeter, Model D25M. The Colorimeter was standarized by and the Hunter b values of the samples were read as described above. As shown in Table 3, there was no infestation at Hunter b values 21.4 or less and minimal infestation at 27.4 or less.

B. Papayas were harvested from commercial orchards which had been abandoned. These orchards had the added advantage that fly populations were very high. The color of the fruit was observed immediately after harvest, and the fruit was peeled to expose any ovipositional sites. When an ovipositional site was discovered, the surrounding tissue was examined to determine if eggs, larvae, or both eggs and larvae were present.

Table 4 tabulates the frequency distribution of 'Sunrise' papayas into Hunter b blossom end and yellow spot classes. The fruit was obtained from an abandoned orchard on the Island of Kauai. Table 5 tabulates the frequency distribution of 'Kepoho Solo' papayas (from the Island of Hawaii) into Hunter b blossom end and yellow spot classes. Table 6 shows the frequency distribution of 'Sunrise' papayas (from the Island of Kauai) into Hunter b blossom end and visual ripeness classes. The number of infested fruits in each class in Tables 4–6 is shown in parenthesis.

Observations of natural infestation show little or no infestation in fruit having a blossom end Hunter b value of less than 23.5, regardless of the yellow spot value. Fruit with yellow spot values of less than 27.5 were never infested and fruit with a blossom end value less than 23.5 and a yellow spot reading less than 27.5 were never infested. In general, the yellow spot values were about 2–3 units greater than the blossom end read on the same fruit (Table 4–6).

TABLE 3

| Hunter b ripeness category | Visual ripeness Category | | | | | | | | | |
|---|---|---|---|---|---|---|---|---|---|---|
| | Colorbreak | | One-Quarter | | One-half | | Three-quarter | | Total | |
| | Fruits examined (no.) | Infested fruits (no.) | Fruits examined (no.) | Infested fruits (no.) | Fruits examined (no.) | Infested fruits (no.) | Fruits examined (no.) | Infested fruits (no.) | Fruits examined (no.) | Infested fruits (no.) |
| 10–15.4 | 102 | 0 | 12 | 0 | 3 | 0 | 0 | 0 | 117 | 0 |
| 15.5–18.4 | 186 | 0 | 74 | 0 | 9 | 0 | 0 | 0 | 269 | 0 |
| 18.5–21.4 | 12 | 0 | 137 | 0 | 51 | 0 | 3 | 0 | 203 | 0 |
| 21.5–24.4 | 0 | 0 | 62 | 0 | 61 | 2 | 8 | 0 | 131 | 2 |
| 24.5–27.4 | 0 | 0 | 11 | 0 | 81 | 5 | 10 | 0 | 102 | 5 |
| 27.5–30.4 | 0 | 0 | 4 | 0 | 59 | 6 | 31 | 10 | 94 | 16 |
| 30.5–33.4 | 0 | 0 | 0 | 0 | 29 | 4 | 94 | 28 | 123 | 32 |
| 33.5–36.4 | 0 | 0 | 0 | 0 | 7 | 0 | 122 | 50 | 129 | 50 |
| 36.5–39.4 | 0 | 0 | 0 | 0 | 0 | 0 | 32 | 10 | 32 | 10 |
| Totals | 300 | 0 | 300 | 0 | 300 | 17 | 300 | 98 | 1200 | 115 |

TABLE 4

| Blossom End Classes | Yellow Spot Classes | | | | | | | | | | | |
|---|---|---|---|---|---|---|---|---|---|---|---|---|
| | From 9.5 To 12.4 no. | 12.5 15.4 no. | 15.5 18.4 no. | 18.5 21.4 no. | 21.5 24.4 no. | 24.5 27.4 no. | 27.5 30.4 no. | 30.5 33.4 no. | 33.5 36.4 no. | 36.5 39.4 no. | 39.5 — no. | Total no. |
| 8.5–11.4 | 0 | 0 | 0 | 0 | 0 | 0 | 0 | 0 | 0 | 0 | 0 | 0 |
| 11.5–14.4 | 0 | 0 | 0 | 1 | 1 | 1 | 1 | 0 | 0 | 0 | 0 | 4 |
| 14.5–17.4 | 0 | 0 | 0 | 8 | 27 | 20 | 14 | 6 | 1 | 0 | 0 | 76 |
| 17.5–20.4 | 0 | 0 | 0 | 2 | 6 | 25 | 24 | 19 | 10 | 1 | 0 | 87 |
| 20.4–23.4 | 0 | 0 | 0 | 0 | 2 | 6 | 14 | 29 | 24(2) | 2 | 0 | 77(2) |
| 23.5–26.4 | 0 | 0 | 0 | 0 | 0 | 0 | 8(1) | 38(3) | 53(5) | 3 | 0 | 102(9) |
| 26.5–29.4 | 0 | 0 | 0 | 0 | 0 | 0 | 2(1) | 48(7) | 82(7) | 9 | 0 | 141(15) |
| 29.5–32.4 | | 0 | 0 | 0 | 0 | 0 | 0 | 16(3) | 49(4) | 12 | 2 | 79(7) |

TABLE 4-continued

| Blossom End Classes | Yellow Spot Classes | | | | | | | | | | |
|---|---|---|---|---|---|---|---|---|---|---|---|
| | From 9.5 To 12.4 no. | 12.5 15.4 no. | 15.5 18.4 no. | 18.5 21.4 no. | 21.5 24.4 no. | 24.5 27.4 no. | 27.5 30.4 no. | 30.5 33.4 no. | 33.5 36.4 no. | 36.5 39.4 no. | 39.5 — no. | Total no. |
| 32.5– | 0 | 0 | 0 | 0 | 0 | 0 | 0 | 1 | 1 | 0 | 1 | 3 |
| Total | 0 | 0 | 0 | 11 | 36 | 52 | 63(2) | 157(13) | 220(18) | 27 | 3 | 569(33) |

TABLE 5

| Blossom End Classes | Yellow Spot Classes | | | | | | | | | | |
|---|---|---|---|---|---|---|---|---|---|---|---|
| | From 9.5 To 12.4 no. | 12.5 15.4 no. | 15.5 18.4 no. | 18.5 21.4 no. | 21.5 24.4 no. | 24.5 27.4 no. | 27.5 30.4 no. | 30.5 33.4 no. | 33.5 36.4 no. | 36.5 39.4 no. | 39.5 — no. | Total no. |
| 8.5–11.4 | 0 | 0 | 0 | 0 | 0 | 0 | 0 | 0 | 0 | 0 | 0 | 0 |
| 11.5–14.4 | 0 | 0 | 0 | 0 | 0 | 0 | 0 | 0 | 0 | 0 | 0 | 0 |
| 14.5–17.4 | 0 | 0 | 2 | 16 | 27 | 8 | 11 | 5 | 0 | 0 | 0 | 69 |
| 17.5–20.4 | 0 | 0 | 2 | 6 | 33 | 48 | 33 | 21 | 3 | 2 | 0 | 148 |
| 20.4–23.4 | 0 | 0 | 0 | 1 | 8 | 23 | 33 | 28 | 11 | 5 | 0 | 109 |
| 23.5–26.4 | 0 | 0 | 0 | 0 | 0 | 7 | 9 | 22 | 28 | 12 | 0 | 78 |
| 26.5–29.4 | 0 | 0 | 0 | 1 | 0 | 1 | 3 | 17 | 53(5) | 34(4) | 0 | 109(9) |
| 29.5–32.4 | 0 | 0 | 0 | 0 | 0 | 0 | 1 | 17 | 88(14) | 102(11) | 5 | 213(25) |
| 32.5–35.4 | 0 | 0 | 0 | 0 | 0 | 0 | 0 | 5 | 124(12) | 186(23) | 9(2) | 324(37) |
| 35.5–38.4 | 0 | 0 | 0 | 0 | 0 | 0 | 0 | 0 | 10 | 17 | 0 | 27 |
| 38.5– | 0 | 0 | 0 | 0 | 0 | 0 | 0 | 0 | 0 | 1 | 0 | 1 |
| Total | 0 | 0 | 4 | 24 | 68 | 87 | 90 | 115 | 317(31) | 359(38) | 14(2) | 1078(71) |

TABLE 6

| Blossom End Classes | Visual Ripeness Classes | | | | |
|---|---|---|---|---|---|
| | Color-break no. | One-quarter no. | One-half no. | Three-quarter no. | Total no. |
| 12.4 | 11 | 0 | 0 | 0 | 11 |
| 12.5–15.4 | 103 | 24 | 3 | 0 | 130 |
| 15.5–18.4 | 117 | 124 | 35 | 0 | 277 |
| 18.5–21.4 | 17 | 140 | 76 | 8 | 241 |
| 21.4–24.4 | 1 | 94 | 112 | 32 | 239 |
| 24.5–27.4 | 0 | 32 | 87 | 48 | 167 |
| 27.5–30.4 | 0 | 7 | 101 | 63 | 171 |
| 30.5–33.4 | 0 | 2 | 74(1) | 45 | 121(1) |
| 33.5–36.4 | 0 | 0 | 40 | 37(3) | 77(3) |
| 36.5– | 0 | 0 | 11 | 11 | 22 |
| Total | 249 | 423 | 539(1) | 245(3) | 1456(4) |

EXAMPLE 8

Evaluation of the Prediction Model

Papayas obtained from the Puna district of the island of Hawaii were subjected to one or two hot water schedules—a single immersion of 49.0±0.2° C. for 20 minutes or a two-stage immersion of 41.8±0.3° C. for 40 minutes followed by 49.3±0.8° C. for 20 minutes. The ± refers to the standard deviations among the measured values. A precision thermistor was inserted to a measured depth in each of the eight fruit chosen for each schedule, average maximum fruit diameter, 9.3±0.4 cm. The thermistor was connected to a Keithley 177 DVM in the resistive mode with the analog output signal taken as the analog input (14 bit conversion) of a microcomputer. Temperature as a function of immersion duration was obtained from the computer output and compared with the predicted temperature profile of a cylinder (equation (8), supra). $T_o$, t, J( ), $a_n$, and r are as defined above. The value for K, the thermal diffusivity, was that for papaya pulp which has been determined to be $1.52 \times 10^{-3}$ cm$^2$/s. For the first immersion, f(r) was taken as the initial uniform temperature. For the second immersion, f(r) was taken as the temperature profile at the end of the first immersion.

FIG. 7 shows the predicted and measured temperature profiles for papaya at the end of either a single or two-stage immersion. The x's and diamonds are the experimental results. The solid curve is not a best fit to the data but the prediction of temperature as a function of time from the prediction model based upon Equation (8). The spread of the data is in part the result of the variation of fruit diameter. The solid curves are for the prediction model where the average fruit diameter was used. This variation is not enough to account for the difference in theoretical and experimental results at the fruit center. The experimental points are for a higher temperature than that predicted by the theory with the deviation being more for the two-stage treatment (i.e., the longer exposed) schedule. This difference is attributed to the assumption that the fruit is cylindrical. Near the surface this assumption is not as severe as in the central region where heat transport from the ends of the fruit contributes. However, since as shown in Example 1, only the outer 4 to 5 mm of the fruit are of concern FIG. 7 indicates that the prediction equation applies.

FIG. 8 gives the temperature profile of papaya as predicted by the model in the outer 5 mm for the temperature at the end of the single or two-stage immersion. From FIG. 8 it can be seen that the two-stage hot water treatment raises the temperature to lethal temperatures for the organism even at a depth into the papaya of 4–5 mm without raising the surface temperature of the papaya above that of the single immersion. Comparing Table 1 (Example 1), FIG. 2 (Example 2) and FIG. 8, it can be seen that the two-stage treatment in combination with the fruit selection procedure provides a means to disinfest papaya of fruit flies and minimize heat damage to papaya. In contrast, as can be seen from the slope of the curve for the single immersion, to reach temperatures lethal for fruit flies at a depth into the fruit of 4–5 mm, it is necessary to raise the surface temperature of the fruit, thereby resulting in heat damage.

Comparing the prediction of equation (8) and the probability of egg occurrence from Table 1 with the temperature time exposure needed for a probit 9 as shown in FIG. 2, the overall survival from the two-stage heat treatment method may be estimated.

FIG. 9 gives the temperature as a function of exposure time for the two-stage heat treatment. The upper solid line shows the water temperature for the treatment: 42° C./40 minutes+49° C./20 minutes. The dotted line gives the temperature as a function of time at a depth of 2.5 mm into the fruit calculated from equation (8). The lower solid line shows a temperature-exposure schedule from FIG. 2 which results in a probit 9 mortality. By combining a series of these curves together with the egg-depth probability, Table 1, an overall probit can be estimated. FIG. 10 gives the result of this composite predicted probit as a function of papaya diameter. The average papaya diameter, about 9 cm, is in the range of a probit 9.

EXAMPLE 9

Testing of Two-Stage Heated Water Treatment on Artifically Infested Papaya

A. Papayas were harvested at ⅛ to ¼ ripe to minimize natural infestation. These fruits were then held 2 to 3 days under secure conditions, that is, in an area free of fruit flies, at about 30° C. to ripen. When the fruit was ripe enough to permit infestation, 75 fruits were exposed to about 15,000 adult flies (about ½ gravid females) of the desired species for about 24 hours. After infestation, the fruits were randomly assigned to 5 groups of 15 fruits each. One of these groups was arbitrarily designated the non-treated control. The remaining 4 lots were treated by submerging them in heated water at 42° C. for 40 minutes, then immediately transferring them to water at 49° C. for 20 minutes. Immediately after the 49° C. treatment the temperature was measured at a point about 6 mm below fruit surface. The fruit was weighed and placed in a holding cabinet on appropriate fruit fly rearing diet. The controls and treated samples were in separate cabinets in separate screened rooms. After about 2 weeks of larval development in the fruit and larval diet, the larvae emerged from the fruit or diet and pupated in sand in the bottom of the cabinets. All larvae pupating were considered to be survivors. The initial population in the treated lots was estimated by multiplying the number of survivors in the controls by the weight of fruit in the treated lots divided by the weight of fruit in the non-treated controls. Comparable samples of non-infested papayas were treated in an identical way and held to be examined for evidence of fruit damage.

As shown in Table 7, exposure of papaya to the combined temperature regimen of 42° C. for 40 minutes and 49° C. for 20 minutes effectively kills all fruit fly infestation less than 24 hours old viz. eggs. Older infestations which may include larvae are more difficult to control because the larvae may move farther into the fruit where the temperature is lower. As shown in Table 8, 0.67% survival was found for first instar *D. dorsalis* larvae. However, as shown in Example 6, papaya selected by out color procedure contain little or no larvae of any of the three fruit fly species. Thus, quarantine control can be attained by using in combination the two-stage heat treatment and fruit selection method.

B. Varying First Stage Heating Times

Papayas for these tests were obtained from the packing house at a ripeness which ensured that the fruit would have minimal natural infestation, and held 3-4 days in a secure area at about 30° C. to ripen to an infestable stage. The papayas were exposed to *D. dorsalis* fruit flies. After infestation for 24 hours, the fruit was removed from the infestation cages and either treated immediately (egg infestations) or after a 48-hour delay (larval infestations).

The infested papaya were treated for 0, 10, 20, 30, or 40 minutes at 42° C. and for 20 minutes at 49° C. After treatment, the fruit was cooled for 20 minutes in a spray of water at about 22° C. The fruit was treated in a commercial heat treatment facility during usual operation. The infested fruits in mesh bags were buried in bins of fruit. Water and fruit temperatures were recorded with an Omnidata polycorder. Infestation levels were estimated from a random sample of infested fruit at each replication.

As shown in Tables 9 and 10, the time for the first stage heat treatment can be shortened without increasing the risk of survival of either eggs or larvae.

TABLE 7

| | Water Bath Temperature | | | | No. of Fruit | Wt. in Kg. | No. Fruit Infested | No. of Pupae | Est. Pop. | Survivors per 100,000 | Upper 95% CL per 100,000 |
| | First Heat | | Second Heat | | | | | | | | |
| | Start | Final | Start | Final | | | | | | | |
|---|---|---|---|---|---|---|---|---|---|---|---|
| *C. capitata* | | | | | | | | | | | |
| Control | | | | | 43 | 23.1 | 26 | 100626 | | | |
| Hot water | 41.0 | 42.0 | 49.5 | 49.0 | 180 | 96.1 | 0 | 0 | 430962 | 0 | 1 |
| *D. dorsalis* | | | | | | | | | | | |
| Control | | | | | 254 | 118.2 | 66 | 87832 | | | |
| Hot water | 41.8 | 42.1 | 49.2 | 49.3 | 5598 | 281.5 | 1 | 6 | 297984 | 2 | 4 |
| *D. cucurbitae* | | | | | | | | | | | |
| Control | | | | | 75 | 41.8 | 43 | 18308 | | | |
| Hot water | 41.4 | 41.9 | 49.3 | 49.0 | 5300 | 167.5 | 0 | 0 | 73783 | 0 | 4 |
| *D. dorsalis* omitting replication 5 | | | | | | | | | | | |
| Control | | | | | 239 | 111.8 | 64 | 87635 | | | |
| Hot water | 41.8 | 42.1 | 49.2 | 49.0 | 5568 | 268.6 | 0 | 0 | 297587 | 0 | 1 |

TABLE 8

| | Water Bath Temperature | | | | No. of Fruit | Wt. in Kg. | No. of Infested | No. of Pupae | Est. Pop. | Survival % |
| | First Heat | | Second Heat | | | | | | | |
| | Start | Final | Start | Final | | | | | | |
|---|---|---|---|---|---|---|---|---|---|---|
| Control | | | | | 120 | 52.60 | 21 | 12210 | | |
| Hot water | 42.0 | 42.0 | 49.5 | 49.5 | 239 | 107.50 | 2 | 170 | 25670 | 0.66 |

TABLE 9

| Treatment | Water Bath Temperature | | | | Fruit weight | Number of pupae | Estimated population | Upper 95% C.L. | |
|---|---|---|---|---|---|---|---|---|---|
| | First Heat | | Second Heat | | | | | | |
| | Initial | Final | Initial | Final | | | | no. | no./100000 |
| Replication 1 | | | | | | | | | |
| Control | — | — | — | — | 27.9 | 15,014 | — | | |
| 10 min | 42.2 | 42.4 | 48.6 | 48.9 | 25.0 | 142 | 13,428 | | |
| 20 min | 42.0 | 42.6 | 48.8 | 48.8 | 26.1 | 0 | 14,041 | | |
| 30 min | 42.3 | 42.6 | 48.9 | 49.3 | 23.8 | 0 | 12,820 | | |
| 40 min | 42.7 | 41.9 | 48.3 | 25.7 | 0 | 13,793 | | | |
| Replication 2 | | | | | | | | | |
| Control | — | — | — | — | 27.3 | 12,126 | — | | |
| 10 min | 41.2 | 41.7 | 47.4 | 48.3 | 26.4 | 0 | 11,721 | | |
| 20 min | 41.8 | 42.2 | 48.2 | 48.6 | 27.0 | 0 | 12,028 | | |
| 30 min | 41.9 | 42.2 | 48.7 | 48.8 | 26.8 | 0 | 11,926 | | |
| 40 min | 41.8 | 41.7 | 48.2 | 48.5 | 25.2 | 0 | 11,219 | | |
| Replication 3 | | | | | | | | | |
| Control | — | — | — | — | 22.3 | 17,916 | — | | |
| 10 min | 41.2 | 41.4 | 48.4 | 48.7 | 21.8 | 33 | 17,554 | | |
| 20 min | 41.7 | 42.1 | 48.4 | 48.7 | 22.6 | 0 | 18,190 | | |
| 30 min | 41.8 | 41.9 | 48.8 | 48.9 | 22.6 | 0 | 18,190 | | |
| 40 min | 41.3 | 42.0 | 48.6 | 48.7 | 23.0 | 0 | 18,463 | | |
| Totals | | | | | | | | | |
| Control | | | | | | 45,056 | | | |
| 10 | | | | | | 175 | 42,703 | | |
| 20 | | | | | | 0 | 44,259 | 3 | 6.8 |
| 30 | | | | | | 0 | 42,936 | 3 | 7.0 |
| 40 | | | | | | 0 | 43,475 | 3 | 6.9 |

TABLE 10

| Treatment | Temperature | | | | Fruit weight | Number of pupae | Estimated population | Survival % |
|---|---|---|---|---|---|---|---|---|
| | First Heat | | Second Heat | | | | | |
| | Initial | Final | Initial | Final | | | | |
| Replication 1 | | | | | | | | |
| Control | — | — | — | — | 25.4 | 20,212 | — | |
| 10 min | 41.7 | 41.7 | 48.6 | 48.8 | 27.7 | 868 | 22,017 | |
| 20 min | 41.7 | 41.8 | 48.8 | 48.9 | 27.2 | 285 | 21,659 | |
| 30 min | 42.0 | 42.2 | 49.6 | 49.1 | 26.11 | 94 | 20,761 | |
| 40 min | 42.1 | 42.4 | 48.7 | 49.0 | 26.8 | 3 | 21,301 | |
| Replication 2 | | | | | | | | |
| Control | — | — | — | — | 24.5 | 32,970 | | |
| 10 min | 42.4 | 43.2 | 48.8 | 48.7 | 24.3 | 342 | 32,661 | |
| 20 min | 42.8 | 43.5 | 48.4 | 48.6 | 24.3 | 937 | 32,661 | |
| 30 min | 42.8 | 43.4 | 47.7 | 48.2 | 25.7 | 104 | 34,489 | |
| 40 min | 42.1 | 42.0 | 48.2 | 48.6 | 25.7 | 2,497 | 34,489 | |
| Replication 3 | | | | | | | | |
| Control | — | — | — | — | 22.1 | 16,540 | | |
| 10 min | 40.8 | 41.1 | 47.5 | 47.9 | 22.7 | 1,766 | 16,966 | |
| 20 min | 40.8 | 41.1 | 48.5 | 48.5 | 22.0 | 594 | 16,458 | |
| ,0 min | 41.6 | 41.9 | 48.0 | 48.2 | 22.0 | 1,293 | 16,458 | |
| 40 min | 42.0 | 41.8 | 49.0 | 48.9 | 23.6 | 1,902 | 17,646 | |
| Totals | | | | | | | | |
| Control | | | | | | 69,722 | | |
| 10 | | | | | | 2,976 | 71,644 | 4.2 |
| 20 | | | | | | 1,816 | 70,778 | 2.6 |
| 30 | | | | | | 1,491 | 71,708 | 2.1 |
| 40 | | | | | | 4,402 | 73,436 | 6.0 |

EXAMPLE 10

Testing of the Method for Commercial Use

A. The invention was tested using a commercial papaya processing facility. Fruit was harvested on a shortened schedule to minimize the amount of ripe fruit that would be removed during the sorting operation. After harvest, the papayas were delivered to the packing house and heat treated in 42° C. water for 40 minutes followed by 49° C. water for 20 minutes. The time between the two heated water treatments was less than 3 minutes. The fruit was hydrocooled in a spray of 20° C. water for 20 minutes and placed in cold storage at about 10° C.

The papayas were packed at the beginning of the morning shift on the next day. The fruit was sorted visually to remove fruit riper than standards prepared by sorting fruit on the Hunter colorimeter. A quality control sample was removed as the fruit was packed. This fruit was taken to the laboratory and Hunter values read on the blossom end of the fruit. This fruit was placed at 10° C. in laboratory cold rooms for 7 days, then at ambient laboratory temperature for 5 to 7 days and examined for decay, heat injury, or changes in flavor and texture. The remainder of the packed fruit was placed in a secure area and held at about 25° C. for 7 or 8 days until fully ripe. It was then examined for any evidence of infestation by fruit flies. Any fruit showing indications of infestation was taken to the laboratory for more detailed examination.

During heat treatments, temperature of the water and the fruit was monitored with a multipoint recorder and thermocouples. To obtain reliable fruit temperature, the thermocouples were inserted all the way through the fruit to a point either 0.5 or 1 cm below the surface of the fruit. These temperatures were used for comparison with temperatures calculated from the model described above.

For confirmation of laboratory experiments, fruit samples infested as described in Example 9 were placed in mesh bags near the center of the bins of papayas during treatment. All of these infestations were approximately 24 hours old and consisted of eggs, but not larvae. After treatment, the infested fruits were recovered and returned to the laboratory for holding as described above.

As shown in Table 11, no infested fruit was found in any of the eight replications. It is apparent that lethal temperatures are achieved in large scale, commercial heating tanks as in laboratory scale experiments.

The distribution of fruit into ripeness classes based on Hunter b values is shown in Table 12. In the first 4 replications, the standard was a Hunter b value of 24.5 or less; in thd last 4 replications, the standard was a Hunter b value of 21.5 or less. Although a few fruits were above the levels desired it was clear that the sorters and packers quickly learned to select fruit to a given standard.

B. Papaya were obtained from commercial orchards, harvested as usual. The fruit was sorted using a Hunter Colorimeter and those fruit rejected which had a blossom end Hunter b value of over 23.5 or a yellow spot value over 27.5 The fruit was heat treated in 42° C. water for 30 minutes followed by a heat treatment in 49° C. for 20 minutes. The time between the two heated water treatments was less than 3 minutes. The fruit was hydrocooled for 20 minutes in a spray of water at about 22° C. Five replications of about 10,000 fruit each were carried out. A quality control sample of about 5% was taken from each 10,000-fruit replication. The papayas were packed in a commercial packing house in regular cartons. All of the fruit was permitted to ripen at about 25°–27° C. for 8 days and then each fruit was cut and examined for evidence of infestation or hard fruit syndrome.

As shown in Table 13, the fruit was free from both infestation and hard fruit syndrome. If the distribution of papayas into Hunter b, blossom end and yellow spot classes in the test (Table 14) is compared with the distribution of natural infestation (Tables 4 and 5) in the same classes, it is clear that even fruit exceeding either standard does not fall into infested classes. Only fruit which exceeds both standards falls into infested classes.

TABLE 11

| | Water Bath Temperature | | | | No. of Fruit | No. of Pupae | Estimated Population | Survivors per 100,000 | Upper 95% CL per 100,000 |
| | First Heat | | Second Heat | | | | | | |
| | Start | Final | Start | Final | | | | | |
|---|---|---|---|---|---|---|---|---|---|
| *C. capitata* | | | | | | | | | |
| Control | | | | | 60 | 47,876 | | | |
| Hot water | 41.8 ± .6 | 41.9 ± .4 | 48.6 ± .4 | 48.7 ± .5 | 240 | 0 | 188,304 | 0 | 1.59 |
| *D. dorsalis* | | | | | | | | | |
| Control | | | | | 90 | 78,518 | | | |
| Hot water | 41.8 ± .6 | 41.9 ± .4 | 48.6 ± .4 | 48.7 ± .5 | 360 | 0 | 314,072 | 0 | 0.96 |
| *D. cucurbitae* | | | | | | | | | |
| Control | | | | | 90 | 54,732 | | | |
| Hot water | 41.8 ± .6 | 41.9 ± .4 | 48.6 ± .4 | 48.7 ± .5 | 360 | 0 | 218,928 | 0 | 1.37 |

TABLE 12

| | | | | Quality Control Sample Hunter b classes | | | | | | | |
|---|---|---|---|---|---|---|---|---|---|---|---|
| Replication | No. of cartons | No. fruits examined | From To | 9.5 15.4 | 15.5 18.4 | 18.5 21.4 | 21.5 24.4 | 24.5 27.4 | 27.5 30.4 | Total | Infested fruits |
| 1 | 70 | 1232 | | 18 | 22 | 11 | 4 | 0 | 0 | 55 | 0 |
| 2 | 70 | 1232 | | 17 | 29 | 12 | 5 | 0 | 0 | 63 | 0 |
| 3 | 70 | 1232 | | 5 | 24 | 16 | 9 | 3 | 2 | 59 | 0 |
| 4 | 70 | 1232 | | 7 | 25 | 18 | 5 | 4 | 0 | 59 | 0 |
| 5 | 263 | 4629 | | 123 | 243 | 113 | 26 | 1 | 0 | 506 | 0 |
| 6 | 305 | 4819 | | 191 | 275 | 50 | 4 | 0 | 0 | 520 | 0 |
| 7 | 700 | 6300 | | 402 | 110 | 10 | 0 | 0 | 0 | 522 | 0 |
| 8 | 864 | 7776 | | 314 | 169 | 17 | 0 | 0 | 0 | 500 | 0 |
| Total | | 28452 | | 1077 | 897 | 247 | 53 | 8 | 2 | 2284 | 0 |
| Grand Total | | 30737 | | | | | | | | | |

TABLE 13

| Replication | Number of cartons | Number of fruits | Number infested | Number hard | Quality Control Sample, Hunter b | | | | | | | | | | | Total |
| | | | | | Blossom End | | | | | Yellow Spot | | | | | | |
| | | | | | 8.5–14.4 | 14.5–17.4 | 17.5–20.4 | 20.5–23.4 | 23.5+ | 9.5–15.4 | 15.5–18.4 | 18.5–21.4 | 21.5–24.4 | 24.5–27.4 | 27.5+ | |
|---|---|---|---|---|---|---|---|---|---|---|---|---|---|---|---|---|
| 1 | 1000 | 10,000 | 0 | 0 | 73 | 188 | 148 | 67 | 19 | 93 | 176 | 131 | 72 | 20 | 3 | 495 |
| 2 | 1185 | 11,850 | 0 | 1 | 123 | 258 | 98 | 22 | 3 | 49 | 112 | 154 | 121 | 51 | 17 | 504 |
| 3 | 1127 | 11,270 | 0 | 0 | 69 | 258 | 125 | 47 | 4 | 33 | 141 | 161 | 103 | 50 | 15 | 503 |
| 4 | 1068 | 10,680 | 0 | 4 | 168 | 254 | 63 | 8 | 2 | 81 | 163 | 119 | 76 | 40 | 16 | 495 |
| 5 | 1257 | 12,570 | 0 | 0 | 152 | 234 | 95 | 24 | 6 | 136 | 181 | 105 | 65 | 20 | 4 | 511 |
| Total | 5637 | 56,370 | 0 | 5 | 585 | 1192 | 529 | 168 | 34 | 392 | 773 | 670 | 437 | 181 | 55 | 2508 |

TABLE 14

| Blossom End Classes | Yellow Spot Classes | | | | | | | | Total no. |
| | From To | 9.5–12.4 no. | 12.5–15.4 no. | 15.5–18.4 no. | 18.5–21.4 no. | 21.5–24.4 no. | 24.5–27.4 no. | 27.5–30.4 no. | 30.5– no. | |
|---|---|---|---|---|---|---|---|---|---|---|
| 8.5–11.4 | | 1 | 8 | 1 | 3 | 0 | 1 | 0 | 0 | 14 |
| 11.5–14.4 | | 22 | 211 | 202 | 91 | 32 | 12 | 1 | 0 | 571 |
| 14.5–17.4 | | 3 | 127 | 464 | 345 | 172 | 63 | 15 | 3 | 1192 |
| 17.5–20.4 | | 0 | 17 | 93 | 180 | 151 | 62 | 22 | 4 | 529 |
| 20.4–23.4 | | 0 | 2 | 13 | 43 | 73 | 31 | 5 | 1 | 168 |
| 23.5–26.4 | | 0 | 1 | 0 | 8 | 8 | 12 | 3 | 0 | 32 |
| 26.5– | | 0 | 0 | 0 | 0 | 1 | 0 | 1 | 0 | 2 |
| Total | | 26 | 366 | 773 | 670 | 437 | 181 | 47 | 8 | 2508 |

EXAMPLE 11

Evaluation of the Quality of Papaya Treated According to the Method of the Invention A. Evaluation of fruit quality was carried out on papaya treated according to the method of the invention wherein the first immersion was at 42° C. for 40 minutes followed by 49° C. for 20 minutes. Quality tests indicated excellent flavor and texture. In the commercial tests, some intermittent damage was observed which was attributed in part to the heat treatment. In replication 5 of Table 12 (Example 10), areas in the fruit were observed which failed to soften as the rest of the fruit ripened resulting in hard spots. Industry experience indicates that this condition is usually associated with drought but was more severe in treated fruit than in untreated lots. In replication 7, some of the fruit ripened unevenly with scald-like areas on the adaxial or sun side of the fruit. This injury is similar to chilling injury and occurred only in refrigerated lots. This condition was also observed in the non-treated controls, but was more severe in heat-treated lots. This intermittent damage was within acceptable levels.

B. Evaluation of fruit quality was carried out on papaya treated for 0, 10, 20, 30, or 40 minutes at 42° C. and for 20 minutes at 49° C. After treatment the fruit was cooled for 20 minutes in a spray of water at about 22° C. or not hydrocooled. As can be seen from Table 15, reducing the first heating time to 30 minutes reduced the incidence of the hard fruit syndrome.

C. Effect of post-treatment cooling on papaya fruit damage was examined. Papayas were treated for 40 minutes at 42° C. followed by 20 minutes at 49° C. The fruit was then treated by one of the following ways: (1) no cooling, (2) cooling for 20 minutes in a spray of water at about 22° C., or (3) cooling for 10 minutes by submersion in water at about 22° C. Fruit was ripened at ambient temperature for 7 days. As can be seen from Table 16, rapid hydrocooling immediately after treatment reduced the incidence of hard fruit.

TABLE 15

| First Heat (minutes) | Hard Fruit* | |
| | Hydrocooled | Not hydrocooled |
|---|---|---|
| Control | 0.0 | — |
| 10 | 0.0 | 1.3 |
| 20 | 0.9 | 1.3 |
| 30 | 0.0 | 2.8 |
| 40 | 10.0 | 7.9 |
| 50 | 52.6 | 40.0 |

*Based on 4 (not hydrocooled) or 6 (hydrocooled) replications of about 20 fruit per sample. Averages weighted for fruit numbers.

TABLE 16

| Treatment | Replication | Hard Fruit | | | | Avg. |
| | | 1 | 2 | 3 | 4 | |
|---|---|---|---|---|---|---|
| No cooling | | — | 57.5 | 11.1 | 22.4 | 30.3 |
| Sprayed | | 2.0 | 1.0 | 2.1 | 3.5 | 2.2 |
| Submerged | | 1.0 | 7.0 | 5.3 | 0.8 | 5.3 |

EXAMPLE 12

Computer Program

A computer program to calculate survival and mortality of fruit flies is presented in Table 17.

It is understood that the foregoing detailed description is given merely by way of illustration and that modifications and variations may be made therein without departing from the spirit and scope of the invention.

TABLE 17

```
3 AA=122.59 : BB=.554
4 DIM YY(7),DD(7),SS(7),TT(7)
5 FOR P=1 TO 7
6 YY(P)=O
7 NEXT
8 DD(1)=1.5 : DD(2)=2! : DD(3)=2.5 : DD(4)=3!
9 DD(5)=3.5 : DD(6)=4! : DD(7)=4.5
```

TABLE 17-continued

```
10 INPUT "WHAT IS THE MAXIMUM RADIUS ";A
15 DIM B1(10),J1(10)
20 B1(1)=2.4048 :B1(2)=5.5201 :B1(3)=8.6537 :B1(4)=11.7915 :B1(5)=14.9309
30 J1(1)=.5191 :J1(2)=-.3403 :J1(3)=.2715 :J1(4)=-.2325 :J1(5)=.2066
100 INPUT "ORIGINAL FRUIT TEMPERATURE";L4
200 DIM N(11),L2(240),M(11),B(16),F(11),AN(11),AR(11)
300 INPUT "NUMBER OF BATHS";L1
400 FOR I = 1 TO L1
500 PRINT "TEMPERATURE OF WATER IN BATH NUMBER ";I
600 INPUT L2(I)
700 PRINT "EACH BATH IS OF ONE MIN DURATION"
900 NEXT
1000 CLS
1100 FOR I= 0 TO 10
1110 PRINT "WHAT IS THE TEMP AT R = ";I*A/10
1120 INPUT S1
1200 M(I)=S1-L4
1300 NEXT
1400 FOR X=1 TO L1
1500 LPRINT ""
1600 LPRINT "AFTER 1 MIN AT ";L2(X);" DEG C :"
1700 LPRINT ""
1800 LPRINT "RADIUS          TEMPERATURE"
1900 T=1!
2000 V=L2(X)-L4
2100 K=.091
2400 FOR J=0 TO 10
2500 H=0
2700 FOR N=1 TO 5
2710 FOR I = 0 TO 10
2720 XX#=I*B1(N)/10
2730 JO#1
2740 BB#=-1
2750 TERM#=1
2760 FOR JJJ=1 TO 20
2770 TERM#=ABS(TERM#)*BB#*XX#  2/(2*JJJ)  2
2780 BB#=-BB#
2790 JO#=JO#+TERM#
2800 NEXT JJJ
2810 F(I)=(I*A/10)*M(I)*JO#
2820 NEXT I
2830 B(N)=(A/30)*(F(0)+4*F(1)+2*F(2)+4*F(3)+2*F(4)+4*F(5))
2831 B(N)=B(N)+(A/30)*(2*F(6)+4*F(7)+2*F(8)+4*F(9)+F(10))
2900 D=K*B1(N)  2*T/A  2
3000 IF D<.00001 THEN D=0
3100 IF D>50 THEN G=0
3200 IF D<51 THEN G=EXP(-D)
3300 R=J*A/10+.0001
3310 XX#=R*B1(N)/A
3320 JO#=1
3330 BB#=-1
3340 TERM#=1
3350 FOR JJ=1 TO 20
3360 TERM#=ABS(TERM#)*BB#*XX#  2/(2*JJ)  2
3370 BB#=-BB#
3380 JO#=JO#+TERM#
3390 NEXT JJ
3400 H=H-2*V*G*JO#/(B1(N)*J1(N))+2*JO#*G*B(N)/(A  2*J!(N)  2)
3700 NEXT
3800 W=INT(1000*(V+H))/1000
3900 LPRINT R,W+L4
4000 N(J)=W
4100 AN(J)=W=L4
4200 AR(J)=R
4300 NEXT
4500 O=(AN(10)-AN(9))/A
4510 FOR P=1 TO 7
4520 TT(P)=AN(10)-Q*DD(P)
4530 YY(P)=YY(P)-(1/AA)*EXP(BB*(TT(P)-40))
4540 NEXT P
5200 FOR Y = 0 TO 10
5300 M(Y)=N(Y)
5400 NEXT
5510 FOR P=1 TO 7
5520 SS(P)=EXP(YY(P))
5525 NEXT P
5530 STOTAL=.0109*SS(1)+.0511*SS(2)+.1241*SS(3)+.5219*SS(4)
5532 STOTAL=STOTAL+.208*SS(5)+.073*SS(6)+.0109*SS(7)
5540 MORT=1-STOTAL
5550 LPRINT "SURVIVAL: ",STOTAL," MORTALITY: ",MORT
5900 NEXT
6000 END
```

Having thus described out invention, we claim:

1. A quarantine method for papaya, a selection process and disinfestation treatment method, which comprises:
   (a) measuring the color of papaya on a Hunter Colorimeter and rejecting papaya which have either a blossom end Hunter b value greater than 27.4 or a yellow spot Hunter b value greater than 30.5;
   (b) heating the papaya to be treated in a fluid at 38° to 45° C. ($T_1$) for about 30 to 60 minutes ($t_1$); and
   (c) heating the papaya from step (b) in a fluid at 45° to 55° C. ($T_2$) for about 5 to 30 minutes ($t_2$);
   said time between heating steps (b) and (c) does not exceed 3 minutes;
   said temperature of step (b) is lower than the temperature of step (c);
   said time of step (b) is equal to or greater than the time of step (c); and
   wherein three of the values of $T_1$, $t_1$, $T_2$, and $t_2$ are specified and the fourth value is determined from the equation:

$$S = \sum_j s_j P_j$$

wherein S is the overall survival rate of infestation in papaya which is determined by the mortality of fruit flies required; $P_j$ is the probability for the occurrence of a fruit fly egg at depth j, and $s_j$ is the survival of a fruit fly egg at depth j and is determined from the equation:

$$\log s_j = \sum_i \log s_{ij} = \sum_i - \exp(AT_{ij} - B) t_{ij}$$

where A=0.554/°C.; B=26.8; and where $T_{ij}$ is determined from the equation:

$$T = T_o - \frac{2T_o}{R} \sum_{n=1} \frac{\exp(-k\alpha_n^2 t) J_o(r\alpha_n)}{\alpha_n J_1(R\alpha_n)} +$$

$$\frac{2}{R^2} \sum_{n=1} \frac{\exp(-k\alpha_n^2 t) J_o(r\alpha_n)}{J_1^2(R\alpha_n)} \int_0^R rf(r) J_o(r\alpha_n) dr$$

where $T_o$ is the fluid temperature; t is the length of time of heating; r is the distance from the center to the desired position in the fruit; k is $1.52 \times 10^{-3}$ cm$^2$/s; $J_o(\ )$ is a zero order Bessel function of the first kind; $J_1(\ )$ is a zero order Bessel function of the second kind; $\alpha_n$ is determined from the equation:

$$J_o(R\alpha_n) = 0$$

and R is determined from the equation:

$$\text{density} = \text{average fruit mass}/\pi R^2 L$$

where L is the average fruit length from the blossom to stem end.

2. The method of claim 1 wherein said heating of step (b) is at 41° to 43° C. for 30 to 40 minutes; said heating of step (c) is at 48° to 50° C. for 18 to 22 minutes; and those papaya rejected in step (a) have either a blossom end Hunter b value greater than 23.4 or a yellow spot Hunter b value greater than 27.4.

3. The method of claim 1 wherein said heating of step (b) is at 42° C. for 30 minutes and said heating of step (c) is at 49° C. for 20 minutes.

4. The method of claim 3 wherein those papaya rejected in step (a) have either a blossom end Hunter b value greater than 23.4 or a yellow spot Hunter b value greater than 27.4.

5. The method of claim 1 wherein the measuring and rejecting of step (a) is carried out before the heating of step (b).

6. The method of claim 1 wherein the measuring and rejecting of step (a) is carried out after the heating of step (c).

7. The method of claim 1 which further includes hydrocooling the papaya after the heating of step (c).

* * * * *

UNITED STATES PATENT AND TRADEMARK OFFICE
CERTIFICATE OF CORRECTION

PATENT NO. : 4,618,497

DATED : October 21, 1986

INVENTOR(S) : H. Melvin Couey et al.

Page 1 of 2

It is certified that error appears in the above—identified patent and that said Letters Patent is hereby corrected as shown below:

In col. 3, line 28, delete "or" and insert -- of --.
    In col. 3, line 38, before "durations," insert -- the --.
    In col. 4, line 9, delete "50" and insert -- 5 --.
    In col. 5, line 10, delete "Cd" and insert -- C --.
    In col. 5, line 14, delete "1/2 - 1/2 x 1/2 = 1/8" and insert -- 1/2 x 1/2 x 1/2 = 1/8 --.
    In col. 6, line 52, delete "]mortality" and insert -- 9 mortality --.
    In Table 9, cols. 19-20, delete "25.7" printed as the value for Replication 1, 40 min., Second Heat final, and insert -- 48.3 --.
    In Table 9, cols. 19-20, delete "0" printed as the value for Replication 1, 40 min., Fruit weight, and insert -- 25.7 --.
    In Table 9, cols. 19-20, delete "13,793" printed as the value for Replication 1, 40 min., Number of pupae, and insert -- 0 --.
    In Table 9, cols. 19-20, under Replication 1, 40 min., Estimated population, insert -- 13,793 --.
    In Table 10, cols. 19-20, delete ".0 min" printed as the value of Replication 3, treatment, and insert -- 30 min --.
    In col. 22, line 6, delete "thd" and insert -- the --.
    In Table 17, cols. 25-26, delete "2770 TERM#=ABS(TERM#)*BB#*XX# /(2*JJJ) 2" and insert -- 2770 TERM#=ABS(TERM#)*BB#*XX#^2/(2*JJJ)^2 --.
    In Table 17, cols. 25-26, delete "2900 D=K*B1(N) 2*T/A 2" and insert -- 2900 D=K*B1(N)^2*T/A^2 --.
    In Table 17, cols. 25-26, delete "3360 TERM#=ABS(TERM#)*BB#*XX# 2/(2*JJ) 2" and insert --3360 TERM#=ABS(TERM#)*BB#*XX#^2/(2*JJ)^2 --.

UNITED STATES PATENT AND TRADEMARK OFFICE
CERTIFICATE OF CORRECTION

PATENT NO. : 4,618,497

DATED : October 21, 1986

INVENTOR(S) : H. Melvin Couey et al.

It is certified that error appears in the above—identified patent and that said Letters Patent is hereby corrected as shown below:

In Table 17, cols. 25-26 delete "3400 H=H-2*V*G*JO#/B1(N)*J1(N))+2*JO#*G*B(N)/(A  2*J1  2)" and insert -- 3400 H=H-2*V*G*JO#/(B1(N)*J1(N))+2*JO#*G*B(N)/(A^2*J1(N)^2) --.

Signed and Sealed this

Twenty-first Day of April, 1987

Attest:

DONALD J. QUIGG

*Attesting Officer*   *Commissioner of Patents and Trademarks*